(12) United States Patent
Elza et al.

(10) Patent No.: US 7,424,671 B2
(45) Date of Patent: Sep. 9, 2008

(54) METHODS AND SYSTEMS FOR ENABLING COLLABORATIVE AUTHORING OF HIERARCHICAL DOCUMENTS

(75) Inventors: Dethe Elza, Vancouver (CA); Ken Coward, Vancouver (CA); Anton Flego, Vancouver (CA); Michael Fergusson, Vancouver (CA)

(73) Assignee: Justsystems Canada Inc., Vancouver BC (CA)

( * ) Notice: Subject to any disclaimer, the term of this patent is extended or adjusted under 35 U.S.C. 154(b) by 414 days.

(21) Appl. No.: 10/817,013

(22) Filed: Apr. 2, 2004

(65) Prior Publication Data

US 2004/0230560 A1    Nov. 18, 2004

Related U.S. Application Data

(60) Provisional application No. 60/471,567, filed on May 16, 2003, provisional application No. 60/471,284, filed on May 16, 2003.

(51) Int. Cl.
*G06F 17/00* (2006.01)
(52) U.S. Cl. ........................... 715/234; 715/713
(58) Field of Classification Search ................. 715/513, 715/234, 713; 707/511; 709/204–207, 246
See application file for complete search history.

(56) References Cited

U.S. PATENT DOCUMENTS

| | | | |
|---|---|---|---|
| 4,399,504 A * | 8/1983 | Obermarck et al. | 710/200 |
| 4,558,413 A | 12/1985 | Schmidt | |
| 4,965,719 A * | 10/1990 | Shoens et al. | 711/100 |
| 5,226,159 A * | 7/1993 | Henson et al. | 707/8 |
| 5,261,089 A * | 11/1993 | Coleman et al. | 707/8 |
| 5,319,780 A * | 6/1994 | Catino et al. | 707/8 |
| 5,390,316 A * | 2/1995 | Cramer et al. | 709/201 |
| 5,623,359 A | 4/1997 | Giles et al. | |
| 5,623,659 A * | 4/1997 | Shi et al. | 707/8 |
| 5,781,732 A * | 7/1998 | Adams | 709/205 |
| 5,826,268 A | 10/1998 | Schaefer et al. | |
| 5,913,227 A * | 6/1999 | Raz et al. | 711/152 |
| 6,012,984 A | 1/2000 | Roseman | |
| 6,041,360 A | 3/2000 | Himmel | |
| 6,044,367 A | 3/2000 | Wolff | |
| 6,119,149 A | 9/2000 | Notani | |
| 6,125,391 A * | 9/2000 | Meltzer et al. | 709/223 |
| 6,212,640 B1 | 4/2001 | Abdelnur | |
| 6,289,384 B1 | 9/2001 | Whipple | |
| 6,289,385 B1 | 9/2001 | Whipple | |

(Continued)

OTHER PUBLICATIONS

JustSystem, XMetal, 2008, JustSystem, pp. 1-2 in PDF format.*

(Continued)

*Primary Examiner*—Stephen Hong
*Assistant Examiner*—Manglesh M Patel
(74) *Attorney, Agent, or Firm*—Perkins Coie LLP

(57) ABSTRACT

A method in a computer system is disclosed for enabling authors to work on hierarchical documents. The method comprises retrieving a hierarchical document from a server computing device, modifying the retrieved hierarchical document, sending an indication of the modification to the server computing device, and when the modification cannot be applied on the server computing device, reverting the modified hierarchical document to a current form of the hierarchical document on the server computing device.

58 Claims, 22 Drawing Sheets

U.S. PATENT DOCUMENTS

| | | | |
|---|---|---|---|
| 6,296,850 B1 | 10/2001 | Bjorklund | |
| 6,301,584 B1 | 10/2001 | Ranger | |
| 6,307,544 B1 | 10/2001 | Harding | |
| 6,311,187 B1* | 10/2001 | Jeyaraman | 707/10 |
| 6,324,551 B1 | 11/2001 | Lamping | |
| 6,330,573 B1 | 12/2001 | Salisbury | |
| 6,332,163 B1 | 12/2001 | Bowman-Amuah | |
| 6,336,105 B1 | 1/2002 | Conklin | |
| 6,356,920 B1 | 3/2002 | Vandersluis | |
| 6,397,191 B1 | 5/2002 | Notani | |
| 6,397,217 B1 | 5/2002 | Melbin | |
| 6,397,231 B1 | 5/2002 | Salisbury | |
| 6,415,299 B1* | 7/2002 | Baisley et al. | 707/203 |
| 6,418,448 B1* | 7/2002 | Sarkar | 707/104.1 |
| 6,434,568 B1 | 8/2002 | Bowman-Amuah | |
| 6,442,748 B1 | 8/2002 | Bowman-Amuah | |
| 6,446,256 B1 | 9/2002 | Hyman | |
| 6,453,324 B1* | 9/2002 | Baisley et al. | 707/203 |
| 6,457,103 B1 | 9/2002 | Challenger | |
| 6,467,080 B1 | 10/2002 | Devine | |
| 6,476,833 B1* | 11/2002 | Moshfeghi | 715/854 |
| 6,493,671 B1 | 12/2002 | Ladd | |
| 6,499,036 B1 | 12/2002 | Gurevich | |
| 6,502,101 B1 | 12/2002 | Verprauskus | |
| 6,505,200 B1 | 1/2003 | Ims | |
| 6,507,865 B1 | 1/2003 | Hanson | |
| 6,507,891 B1 | 1/2003 | Challenger | |
| 6,519,614 B1 | 2/2003 | Kanai | |
| 6,523,036 B1 | 2/2003 | Hickman | |
| 6,523,042 B2 | 2/2003 | Milleker | |
| 6,529,905 B1* | 3/2003 | Bray et al. | 707/8 |
| 6,529,906 B1* | 3/2003 | Chan | 707/8 |
| 6,529,917 B1 | 3/2003 | Zoltan | |
| 6,529,941 B2 | 3/2003 | Haley | |
| 6,539,359 B1 | 3/2003 | Ladd | |
| 6,539,396 B1 | 3/2003 | Bowman-Amuah | |
| 6,542,911 B2 | 4/2003 | Chakraborty | |
| 6,543,001 B2* | 4/2003 | LeCrone et al. | 714/6 |
| 6,834,275 B2* | 12/2004 | Kanai et al. | 707/1 |
| 6,886,130 B1 | 4/2005 | Unger et al. | |
| 7,054,952 B1* | 5/2006 | Schwerdtfeger et al. | 709/246 |
| 7,290,061 B2* | 10/2007 | Lentini et al. | 709/246 |
| 2002/0049786 A1* | 4/2002 | Bibliowicz et al. | 707/511 |
| 2002/0188605 A1* | 12/2002 | Adya et al. | 707/4 |
| 2003/0070144 A1 | 4/2003 | Schnelle et al. | |
| 2006/0190544 A1* | 8/2006 | Chikirivao et al. | 709/206 |
| 2007/0124373 A1* | 5/2007 | Chatterjee et al. | 709/204 |

OTHER PUBLICATIONS

Fergusson et al., Data-Layer Collaboration in Graphical and Text Authoring, Nov. 7, 2003, svgopen.org, pp. 1-8 in PDF format.*
Raggett, Distributed DOM 1.0, Aug. 10, 2007, W3C, pp. 1-10 in PDF Format.*
Iverson, Lee, "NODAL: A Firesystem for Ubiquitous Collaboration," White Paper, SRI International, Sep. 20, 2001, downloaded by the Examiner on Jan. 13, 2006 from <http://nodal.sourceforge.net/NODAL-WhitePaper.html>, downloaded pp. 1-32.
Iverson, Lee, "[un re-l] Meeting Summary: May 4, 2000, "Message id: 3912508E.2CF1B4C@eng.sun.com from Erick Armstrong, May 4, 2000, downloaded pp. 1-3.
"Perforce 2002.1, User's Guide," Perforce Software, Apr. 2002, pp. 1-158.
Unpublished U.S. Appl. No. 10/817,682.
Unpublished U.S. Appl. No. 10/817,046.
Unpublished U.S. Appl. No. 10/817,045.
Unpublished U.S. Appl. No. 10/817,050.
Unpublished U.S. Appl. No. 10/817,683.
U.S. Appl. No. 10/817,682, Dethe Elza.
U.S. Appl. No. 10/817,046, Dethe Elza.
U.S. Appl. No. 10/817,045, Dethe Elza.
U.S. Appl. No. 10/817,050, Dethe Elza.
U.S. Appl. No. 10/817,683, Dethe Elza.
World Wide Web Consortium ("W3C"), "Document Object Model (DOM) Level 2 HTML Specification", Version 1.0 (W3C Recommendation Jan. 9, 2003), 135 pages, <http://www.w3.org/TR/2003/REC-DOM-Level-2-HTML-20030109/>.
World Wide Web Consortium ("W3C"), "Document Object Model (DOM) Level 2 Views Specification", Version 1.0 (W3C Recommendation Nov. 13, 2000), 21 pages, <http://www.w3.org/TR/2000/REC-DOM-Level-2-Views-20001113/>.
World Wide Web Consortium ("W3C"), "Document Object Model (DOM) Level 2 Traversal and Range Specification", Version 1.0 (W3C Recommendation Nov. 13, 2000), 78 pages, <http://www.w3.org/TR/2000/REC-DOM-Level-2-Traversal-Range-20001113/>.
World Wide Web Consortium ("W3C"), "Document Object Model (DOM) Level 2 Style Specification", Version 1.0 (W3C Recommendation Nov. 13, 2000), 132 pages, <http://www.w3.org/TR/2000/REC-DOM-Level-2-Style-20001113/>.
World Wide Web Consortium ("W3C"), "Document Object Model (DOM) Level 2 Events Specification", Version 1.0 (W3C Recommendation Nov. 13, 2000), 50 pages, <http://www.w3.org/TR/2000/REC-DOM-Level-2-Events-20001113/>.
World Wide Web Consortium ("W3C"), "Document Object Model (DOM) Level 2 Core Specification", Version 1.0 (W3C Recommendation Nov. 13, 2000), 107 pages, <http://www.w3.org/TR/2000/REC-DOM-Level-2-Core-20001113/>.

* cited by examiner

METHODS AND SYSTEMS FOR ENABLING COLLABORATIVE AUTHORING OF HIERARCHICAL DOCUMENTS

CROSS-REFERENCES TO RELATED APPLICATION(S)

This patent application claims the benefit of U.S. Provisional Patent Application Nos. 60/471,284, now expired, and 60/471,567, now expired, which were both filed on May 16, 2003 and entitled "DISTRIBUTED DOCUMENT OBJECT MODEL" and are both incorporated herein by reference in their entireties.

TECHNICAL FIELD

The described technology relates generally to collaborative authoring, and more particularly to methods and systems for enabling collaborative authoring of hierarchical documents in a distributed computing system.

BACKGROUND

Documents can be described by using an extensible markup language ("XML"). Such documents may be termed XML documents and described in a hierarchical manner. A hierarchical document may need to be manipulated to add, remove, or modify portions of the document. Such manipulations may be performed in a variety of ways including directly by modifying XML "tags" that describe the document or programmatically by using a Document Object Model ("DOM").

The DOM is an application programming interface ("API") specification established by the World Wide Web Consortium ("W3C"). The W3C defines the DOM as "a platform- and language-neutral interface that will allow programs and scripts to dynamically access and update the content, structure and style of documents." The World Wide Web consortium's ("W3C") web site, w3c.org, provides a DOM specification. The DOM presents a programming interface for well-formed XML documents, including valid HTML, and defines how to manipulate a Document Object, such as an XML document. Using the DOM, a software program can, e.g., create a document, navigate its structure, and add, retrieve, modify, or delete its contents.

The DOM presents a tree view of the XML document. An XML tree comprises "elements" in which the "documentElement" is the top-level element of the tree. The documentElement may have one or more "childNodes" that represent the branches of the tree. A software program may use the DOM's Node Interface to read and write elements in the XML tree. As an example, the following VBScript code uses the DOM to traverse nodes of an XML document and write the nodeValue of each element that is a child of the documentElement:

```
for each x in xmlDoc.documentElement.childNodes
    document.write(x.nodeName)
    document.write(": ")
    document.write(x.nodeValue)
next
```

A tree representation of a hierarchical document appears in FIG. 1. The following is an XML representation of the unshaded elements of the hierarchical document illustrated in FIG. 1:

```
<library text="Seattle">
    <floor text = "1">
        <shelf text = "A">
            <book text = "Romeo and Juliet"/>
            <book text = "Macbeth"/>
        </shelf>
    </floor>
</library>
```

FIG. 2 illustrates the relationship between DOM modules as defined by the W3C and the interfaces available for working with documents.

The DOM defines objects, methods, properties, and events. As an example, the DOM defines a "Document" object that has a "getElementById" method. An example property of an object is "nodeValue" and an example event is "DOMNodeInserted." One skilled in the art will understand that an object model such as the DOM would have multiple objects, methods, properties, and events, and would further understand what they are used for and how they interrelate. The remainder of this specification assumes a baseline understanding of the current XML and DOM art beyond what is described above. This baseline is defined by the W3C DOM specifications, which include Document Object Model (DOM) Level 2 Core Specification Version 1.0 (W3C Recommendation Nov. 13, 2000), Document Object Model (DOM) Level 2 Events Specification Version 1.0 (W3C Recommendation Nov. 13, 2000), Document Object Model (DOM) Level 2 HTML Specification Version 1.0 (W3C Recommendation Jan. 9, 2003), Document Object Model (DOM) Level 2 Style Specification Version 1.0 (W3C Recommendation Nov. 13, 2000), Document Object Model (DOM) Level 2 Views Specification Version 1.0 (W3 C Recommendation, Nov. 13, 2000), and Document Object Model (DOM) Level 2 Traversal and Range Specification Version 1.0 (W3C Recommendation Nov. 13, 2000). These specifications are available at the W3C's web site (last visited Oct. 1, 2003) and are all hereby incorporated herein by reference.

Authors sometimes work together when collaborating on a single document, such as presentation slide decks, books, or research papers. When the authors are working simultaneously on a document, they may want to see mutations (e.g., additions, deletions, updates, or other changes) made by other authors as soon as those mutations are made. The W3C DOM specification does not, however, provide a mechanism for multiple people or software programs to work collaboratively on a single XML document. The W3C DOM specification also does not provide a mechanism for people working on different computers to work on the same XML document simultaneously.

DETAILED DESCRIPTION

Figure 1:
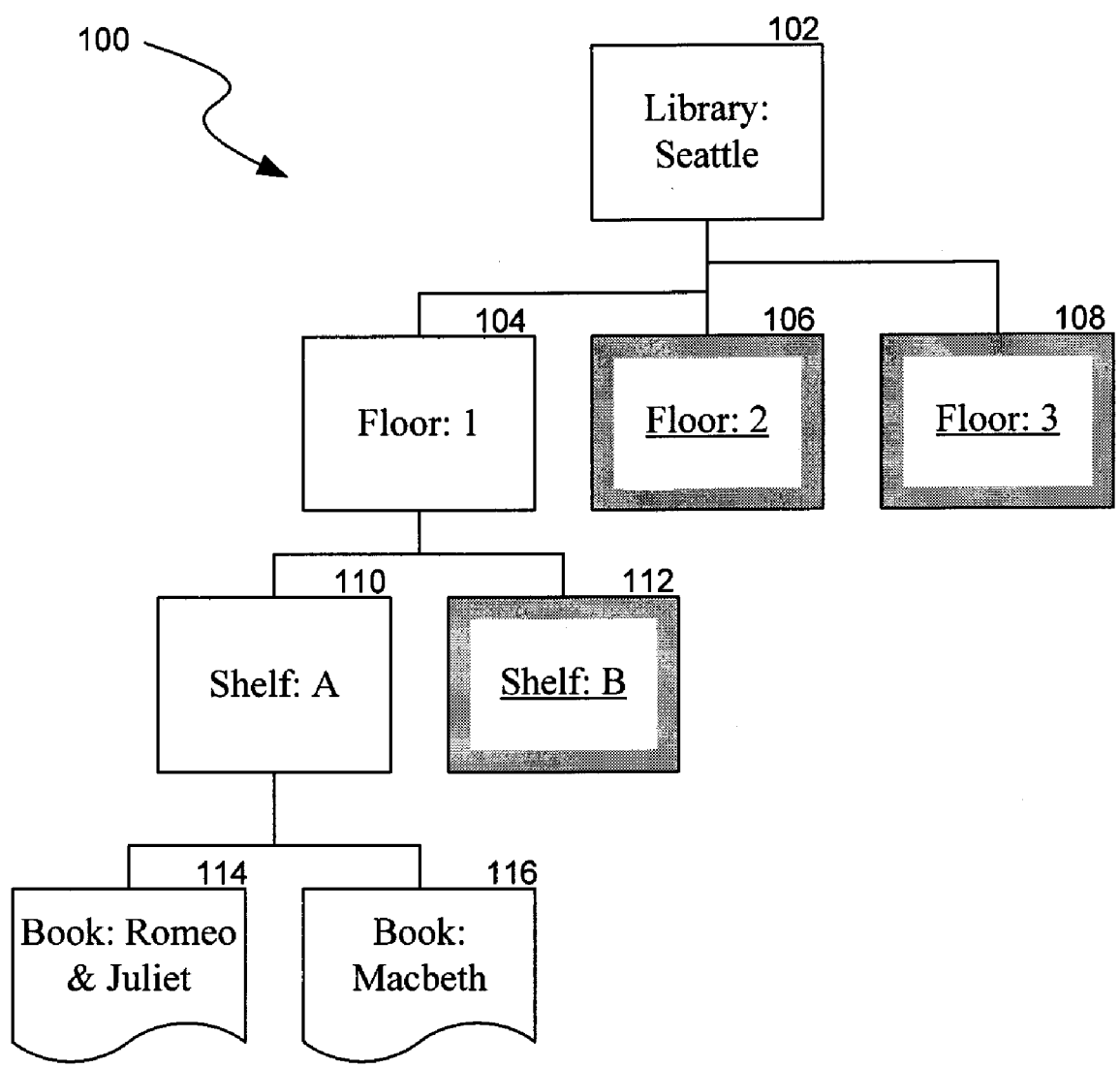
FIG. 1 is a block diagram illustrating a hierarchical document.
Figure 2:
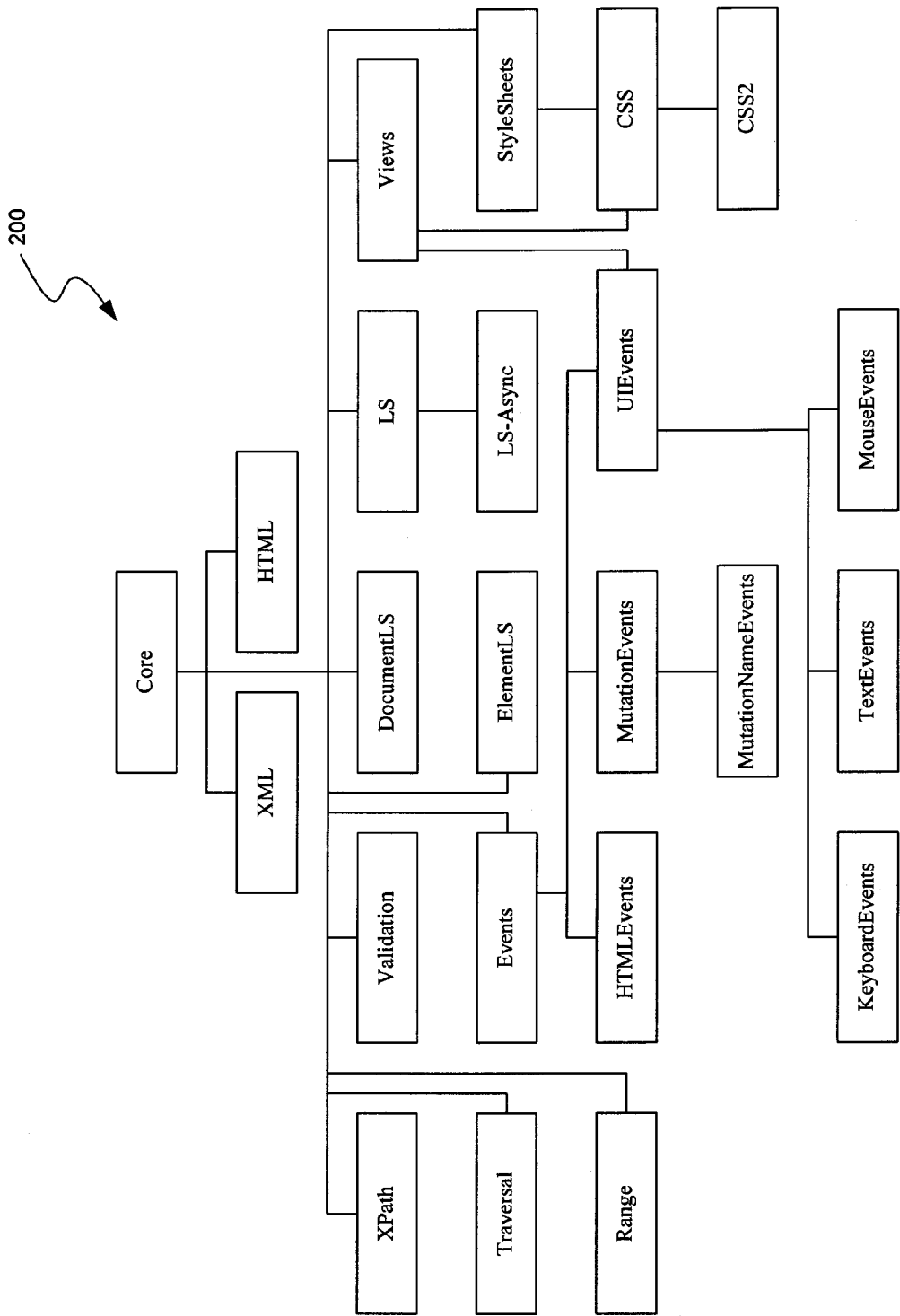
FIG. 2 is a block diagram illustrating the relationship between DOM modules as defined by the W3C.

Methods and systems for enabling collaborative authoring of hierarchical documents are provided. In an embodiment, a distributed document object model ("DDOM") system enables multiple authors using different computing systems to author portions or all of a hierarchical document. These authors may work on the same or different portions of the document simultaneously or at different times. In one scenario of use, an author opens a document on a client computer for editing. The client computer ("client") requests the document from a server computer ("server"). The server, upon determining that the requested document has not already been opened, opens the document by, e.g., loading it from storage or requesting a system to create the document. The server then sends a copy or subset of the document to the client. The client is then said to be "subscribed" to the document. The user of the client is able to view the document's contents and make mutations to the document. These mutations are then propagated to the server for application to the server's document. When additional users open the same document, the server sends a copy of the document, as it presently exists on the server, to the client of each new user. Any further mutations made by any user are propagated from the user's client to the server, and then broadcast from the server to the other clients. In this way, one master version of the document is maintained by the server, the copy of each client is updated as mutations are made, and the users can see the mutations broadcast by the server. This results in a synchronized view of the document for all users.

This synchronization between clients and servers is enabled by various components of the DDOM system acting together. The components of the DDOM system may include the DOM, a DOM tree structure, client and server extensions to the DOM, extensions to the DOM tree structure, and a DDOM communications scheme.

Multi-User System

The DDOM is a multi-user system that stores documents and enables multiple authors to manipulate those documents using computers that may be connected by a network. The system provides components for sending and receiving notifications and other communications relating to mutations made to documents. In one embodiment, the DDOM system is a middleware layer that routes mutation events between a central canonical hierarchical document (i.e., a master version of the document) and multiple remote copies of the document. The DDOM system may handle collaborative issues including, e.g., locking, node identity management, mutation collision avoidance and resolution, and event notification. As a result, the DDOM system enables multiple authors to have a "real-time" view of the current state of the document.

The DDOM system may function in a client/server environment. In such an environment, a master version of a hierarchical document is available from a server. Multiple clients may request the server to load the document and to manipulate portions of the document. Each client may have a local copy of the document. Multiple clients may simultaneously be working on the document. In the client/server environment, there may be a client-side DDOM component and a server-side DDOM component. The server-side DDOM component is responsible for opening documents when requested by clients and providing a copy to the clients, manipulating a master version of the document as requested by clients, distributing mutations to clients so they can update their local copies, providing a locking mechanism for controlling access to portions of documents, providing a versioning mechanism so various versions of the document can be accessed as needed, and so on. The client-side DDOM component provides an interface between application programs that access the documents and the server-side DDOM component. The interface allows an application program to open documents, request mutations, receive mutations from the server-side DDOM component, and so on.

Alternatively, the DDOM system may function in a peer-to-peer environment. In such an environment, one peer computing device may have a master version of the document and may be considered a "server" of the master version. The other peer computing devices may connect with the peer having the master version so that mutations made to a local copy of the document by a user can be sent to the peer having the master version.

Software components of the DDOM system may be used in conjunction with other software components or products. As an example, a word processing software product may use the client-side DDOM components to access and manipulate documents. The DDOM components may be accessed by software components or products written in various languages including, e.g., Python, Java, JavaScript, VBScript, C, C++, C#, and Visual Basic.

Operations initiated by a client in the DDOM system may be characterized based on at least three modes: a tree update mode, a local handler mode, and an invocation mode.

The tree update mode specifies whether mutations are to be applied to the master version or a local copy of the document first. The tree update mode can be either "local before server" or "server before local." In the "local before server" tree update mode, a mutation is applied on the local copy of the client requesting the mutation before the mutation request is sent to the server. This mode may be used, e.g., when the client must be very responsive or a connection speed between the client and its server is slow. In the "server before local" tree update mode, a mutation is applied on the server to the master version of a document before the mutation is applied to the local copy of the client that requested the mutation. This mode may be used, e.g., when the client is connected to a highly responsive server over a high-speed network, or a mutation collision is probable and the client cannot tolerate operations on document states that might not occur on the master version of the document.

The local handler mode specifies when handlers of the client that requests a mutation are to be executed. A handler may perform specialized processing relating to a mutation. For example, a handler may cause further mutations based on a user-initiated mutation. The local handler mode can be asynchronous or synchronous. When in an asynchronous local handler mode, local handlers are invoked after local mutations are made regardless of whether the mutations were successfully applied on the server. Asynchronous local handler mode may be used, e.g., when the client must be very responsive or a connection speed between the client and its server is slow. When in a synchronous local handler mode, local handlers are not invoked until the mutations are successfully applied on the server. Synchronous local handler mode may be used, e.g., when the client is connected to a highly responsive server over a high-speed network, or a mutation collision is probable and the client cannot tolerate operations on document states that might not occur on the master version of the document.

The invocation mode specifies whether requests to the server are handled asynchronously or synchronously. When a function (e.g., to make a mutation) is invoked at a client asynchronously, the function may return immediately. Asynchronous invocation mode may be used, e.g., when the client must be very responsive or a connection speed between the client and its server is slow. When the function is invoked synchronously, it does not return until the server completes its processing. Synchronous invocation mode may be used, e.g., when the client is connected to a highly responsive server over a high-speed network or a mutation collision is probable and the client wants to know when the method call returns.

A local change made by a client before the change is applied on a server may need to be rolled back if the client receives a conflicting message from the server. As an example, if a client receives a broadcast message from a server indicating a mutation that conflicts with a mutation made by a local handler operating asynchronously, the client may need to reinterpret the server's message in view of the state of the local copy of the document, which may result in the need to roll back its local mutation. Similarly, a client operating in local before server tree update mode may be instructed by the server to readjust its local tree to conform with the master version's current state if the server is unable to apply a requested mutation. This might happen, e.g., when another client makes a conflicting mutation. The client uses a local history of mutations to roll back its local mutations.

Various combinations of the above modes may be used. It is not necessary, for example, that a "local before server" tree update mode must be used with a synchronous local handler mode or invocation mode. It may be possible to use a synchronous local handler mode with an asynchronous invocation mode, for example.

Node Identities

The DDOM system has a node identity system that facilitates operation in a multi-user distributed environment. How nodes are identified (i.e., node schema) may affect factors including, e.g., message sizes, node lifecycle management, caching methods and performance, document loading schema and performance, event propagation, privileges and security, ability to recover from crashes, and document persistence. Node identification systems can be placed in at least two groups: structure-dependent and structure-independent. Structure-independent node schemas separate identification of a node from the structure in which the node appears. Structure-dependent node schemas combine identification with structure. While the remainder of this specification describes the use of structure-independent node schemas, structure-dependent node schemas are equally contemplated.

A node identity may be either system-unique or document-unique. When a node identity is system-unique, the node identity will always refer to a specific node across all documents of a DDOM system. On the other hand, when a node identity is document-unique, the node identity may be reused in documents to refer, e.g., to a node in a first hierarchical document and another node in a second hierarchical document.

A unique node identity ("node UID") may be either session-independent or session-dependent. A session-independent node identity is static and does not change from one session to another. A session-dependent node identity may represent one node in a session and a different node in a second session.

The combination of the uniqueness and session attributes of node identities yields four possibilities for node identities: system-unique/session-independent, system-unique/session-dependent, document-unique/session-independent, and document-unique/session-dependent. Each of these four combinations is considered below.

A system-unique/session-independent node identity is a unique identification for a node. Such a node UID enables document persistence, system recovery, and assignment of identifiers by a client to a node created by it. To support this type of node UID, the system stores an indication of an association between nodes and identities. As an example, the client or server may generate globally unique identities. These identities may then be persisted with the document using node attributes of a DDOM namespace.

A system-unique/session-dependent node UID may not be used because a DDOM system typically does not load and use all documents in a session.

A DDOM system may use document-unique/session-independent node UIDs. The DDOM system may either store indications of an association between nodes and identities outside the document containing the nodes or may store the indications inside. Which of the two approaches is selected may depend on a number of factors including, e.g., whether the DDOM system is being used by third-party software and whether compatibility is desired with legacy documents whose structure or schema cannot be modified. When the indications are stored in a secondary document separate from a primary document containing the nodes, the DDOM system may either need to prevent the schema of the primary document from being modified or may need to create the secondary document anew with the assistance of the process that modified the schema. When indications are stored within the primary document, the DDOM system may treat nodes that do not have a DDOM-assigned node UID as new nodes.

A DDOM system may use document-unique/session-dependent node UIDs. When such node UIDs are used, a server of the system may need to create and use a log of activities relating to a document so that when the document is loaded during a new session, the node UIDs appear to be static across sessions. Doing so makes this approach similar to the document-unique/session-independent approach described above with the addition of document-related logs.

The discussion below relates to an embodiment using document-unique/session-independent node UIDs with the primary document containing the node UIDs. However, additional embodiments are contemplated using other schemes for implementing node UIDs described above.

Privileges

The DDOM system supports a concept of privileges. Privileges relate to what operations and functionality a user may access on the system and, more particularly, what operations a user may perform on a node. Descendants of a node inherit an ancestor's privileges in an embodiment. Alternatively, the DDOM system may disable inheritance of privileges by children of a node.

A user may have any combination of Read, Insert, Delete, and Update privileges on a node or may have no privileges whatsoever. A user having a privilege may be referred to as an owner or holder of the privilege. When a user has the Read privilege for a node, the user can, e.g., access the node's element name, invoke methods on the node relating to the read operation, and perform other navigation-related activities on the node.

When a user has the Insert privilege for a node, the user can, e.g., make some changes to the subtree beginning at the node. As an example, the user may be able to append children and set attributes. When a user has Insert privileges on a node, the user can also read the node.

When a user only has the Insert privilege (and not the Read privilege), some read operations may nonetheless be allowed. As examples, the user may be allowed to get the name or attributes of an element. However, operations that require knowledge of the subtree may not be allowed. As examples, the user may not be allowed to call an InsertBefore method or access any attributes relating to the node's children. If a user appends a child to a node for which the user has only the Insert privilege, subsequent operations on the child would fail.

When a user has the Delete privilege for a node, the user can, e.g., remove the node, its children, or its attributes. The user may be able to invoke some methods on the parent of the node such as RemoveChild.

When a user has the Update privilege for a node, the user can, e.g., modify attributes and values relating to the node.

The DDOM system supports a concept of privilege groups. Users may be members of privilege groups. A privilege group extends similar privileges to all of its members. A user of the DDOM system may define privileges for privilege groups relating to document types. A document type is similar to a W3C XML schema file or XML Document Type Definition. As an example, the system may have a set of privilege groups for expense reports and another set of privilege groups for purchase orders. A user may be able to approve expense reports but not purchase orders.

The DDOM system may filter messages sent to a user such that only nodes the user is privileged to read may appear in the message. An advantage to using privilege groups is that messages sent from the server to clients may only need to be filtered by the number of privilege groups that have connected users instead of the total number of connected users.

The API relating to privileges include calls to, e.g., set privileges, get privileges, and determine whether a certain privilege (e.g., Read, Insert, Delete, or Update) is available. These APIs may be applied per user or group on a node or subtree. The server may be able to determine which privilege group a requesting client belongs to. The server may validate the request based on the client's privilege.

Node Locking

The DDOM system provides a node locking mechanism. This mechanism provides a client or group of clients with exclusive access to portions of a document by locking the portions. The node locking mechanism of the DDOM system enables locking of individual nodes, groups of nodes, or sub-trees in a document. When a node is locked, users who do not "own" the lock may not be able to, e.g., set attributes on the node, make mutations on the node such as change its parent, attach or detach children of the node, reorder children of the node, or unlock the node. A node may have various characteristics relating to locking. As examples, a node may not permit locking, may have a maximum lock lease time, or may be grouped for application of common characteristics. The state of the locks may be persisted for a given document between sessions or locks may be removed at the end of a session.

The DDOM system supports a concept of lock leases. A lock lease is the maximum duration of time during which a node can be locked. A node may inherit its maximum lock lease time from its parent or a maximum lock lease time may be declared for the node using an API method or property. Further, if a node does not inherit a maximum lock lease time from a parent and a maximum lock lease time has not been declared for the node, the node may inherit its maximum lock lease time from the document. The maximum lock lease time may have one of several values indicating, e.g., that the node may not be locked, the node may be locked for an infinite period of time, or the node may be locked for a specified duration of time. The lease may be "renewable" in that an application program may attempt to renew a lock lease before the lease expires.

The DDOM system supports a concept of deep locks. Deep locks are locks placed on a parent node and its descendant nodes. Deep locks may be complete or partial, and partial locks can be contiguous or non-contiguous. When a complete deep lock is requested, all descendants of a specified parent node must be locked or the lock request will fail. When a non-contiguous lock is requested, the system attempts to lock all lockable nodes in a sub-tree that are unlocked, including the descendants of nodes that are not lockable. A contiguous partial deep lock does not attempt to lock descendents of nodes in the subtree that cannot be locked. As an example, if node C and node D are children of node B which is a child of node A, and a non-contiguous deep lock is requested on node A when node B is unlockable, the system may lock nodes A, C, and D. In contrast, if a contiguous lock is requested in a similar circumstance, the system would only lock node A because node B could not be locked. A request for a complete lock would fail in this case because all nodes in the subtree beginning at node A are not lockable.

The DDOM system supports a concept of lock bags. A lock bag contains a collection of locked nodes. Lock bags enable grouping of nodes for application of various characteristics that, when applied, apply to all nodes in the lock bag. As an example, a maximum duration for which a lock may be maintained may be applied to a lock bag. When that is done, all nodes contained in the lock bag may be locked for a maximum of the specified time. When a deep lock is requested, the type of deep lock (e.g., complete, contiguous, or non-contiguous) may be configured by characteristics of the lock bag. A lock bag can be given an identification, such as a name, and may be subsequently manipulated using its identification.

A lock bag may allow shared ownership and in such a situation, owners may be primary or secondary. Secondary owners may only be able to take lock-related actions on nodes in a lock bag such as setting a lock lease time. A primary owner, on the other hand, would have all rights a secondary owner has, but also has rights to identify other owners of the lock bag and be able to set characteristics on locks. When shared ownership is not available, only the owner of the lock may be able to take lock-related actions.

Rules govern how nodes and their descendants are locked when the nodes are moved into and out of a lock bag. These rules may consider whether a node is unlocked when it is moved out of a lock bag. They may further consider whether a node will be locked when it is moved into a lock bag and whether this lock will be deep. As an example, a lock bag might specify that nodes moved out of the lock bag become deep unlocked. As another example, if a deep lock has been placed that includes the moved node and its descendants, then the moving of the node may cause both the node and its descendants to become members of the new lock bag. These rules may also consider whether both lock bags are owned by the same user. An administrator of the DDOM system or a software application program may programmatically be able to modify some of these rules. Alternatively, these rules may not be modifiable.

"Coercion" rules specify situations that may trigger errors when a node is moved. As an example, if a node has a shorter lock lease time than the lock lease time of the bag it is being moved into, an error or exception may be triggered by a coercion rule. As a further example, if a node's maximum lease time is shorter than the lease time of the bag into which the node is being moved, an error may be triggered. Alternatively, if the maximum lease time of the bag would be reduced if the node is moved into the bag, an error may be triggered. In various embodiments, coercion rules may be specified by, e.g., an administrator, an application program, or the DDOM system in a manner similar to the rules described above for lock bags.

The DDOM system defines an API for its locking mechanism. This API is comprised of several methods and properties. These methods and properties may relate to individual nodes, lock bags, or other grouping of nodes.

The DDOM system's locking mechanism may also support the concept of privileges. If a user only has Read or Write privileges on a node (i.e., and no other privilege), that user may not be able to lock the node and the locking mechanism may deny a request to place a lock. This is done to prevent a user with limited access from blocking updates to the node by other users. When a client requests a deep lock, the subtrees beginning at nodes for which the requesting user only has Insert privileges may not be locked because the user does not have Read privileges on such subtrees.

DDOM Mutations

Mutation operations that alter the structure of shared documents may require interaction between the clients and server of the DDOM system. Clients send mutation requests to the server and process mutation notifications received from the server. As an example, clients may send the server a message indicating that a node has been added to a tree of the document or removed from the tree. The server processes mutation requests from clients, notifies clients of changes made to the master version of the document, and supplies responses to client-initiated mutation requests. When a node is removed from the document by a client, the server may place the node in a pool of removed nodes to track node removals. Removed nodes may be cleared from the pool as part of a garbage collection activity.

The client may perform operations on DDOM fragments. DDOM fragments are subtrees that are under the client's control and are not yet attached to the master document. When the client performs mutation operations on a DDOM fragment, the client does not need to interact with the server. Clients may begin interacting with the server in relation to mutation operations on a DDOM fragment after the fragment is attached to the document. The DDOM client may use DDOM fragments to assemble a number of nodes and mutation operations before forwarding the fragments and operations to the server. In one embodiment, DDOM fragments do not generate DDOM events. In an alternate embodiment, DDOM fragments generate DDOM events. There may be methods in the DDOM API relating to DDOM fragments.

A DDOM server may perform mutations on the server document in an asynchronous manner without client-initiated requests. These asynchronous mutations may be the result of external events monitored by a business logic component of the server. As an example, the business logic component may monitor a financial database and cause mutations to occur to a document based on changes in the database. These mutations may then be broadcast to connected clients.

Versioning

The DDOM system supports versioning of documents. Any arbitrary version of a document can be recreated in the DDOM system using a snapshot and mutation messages. A snapshot of a document may be periodically stored in a version storage associated with the server. This snapshot completely describes a document at a certain time. The DDOM system also may store messages relating to mutations made to the document. These messages may be stored in a message storage. The system can then "roll forward" or "roll back" a document to its state at any time by applying or removing mutations to a snapshot.

To locate a "document version," the DDOM system may first locate a snapshot that is "near" the desired version. Proximity may be determined based on version numbers or time. Attributes other than version number or time may also be used to specify, locate, or recreate a version of a document. As examples, a version may be specified using a mutation number or combination of attributes such as a time and a mutation number. As an example, the fourth mutation made on Oct. 1, 2003 may be requested.

Illustrated Embodiment

Figure 3:
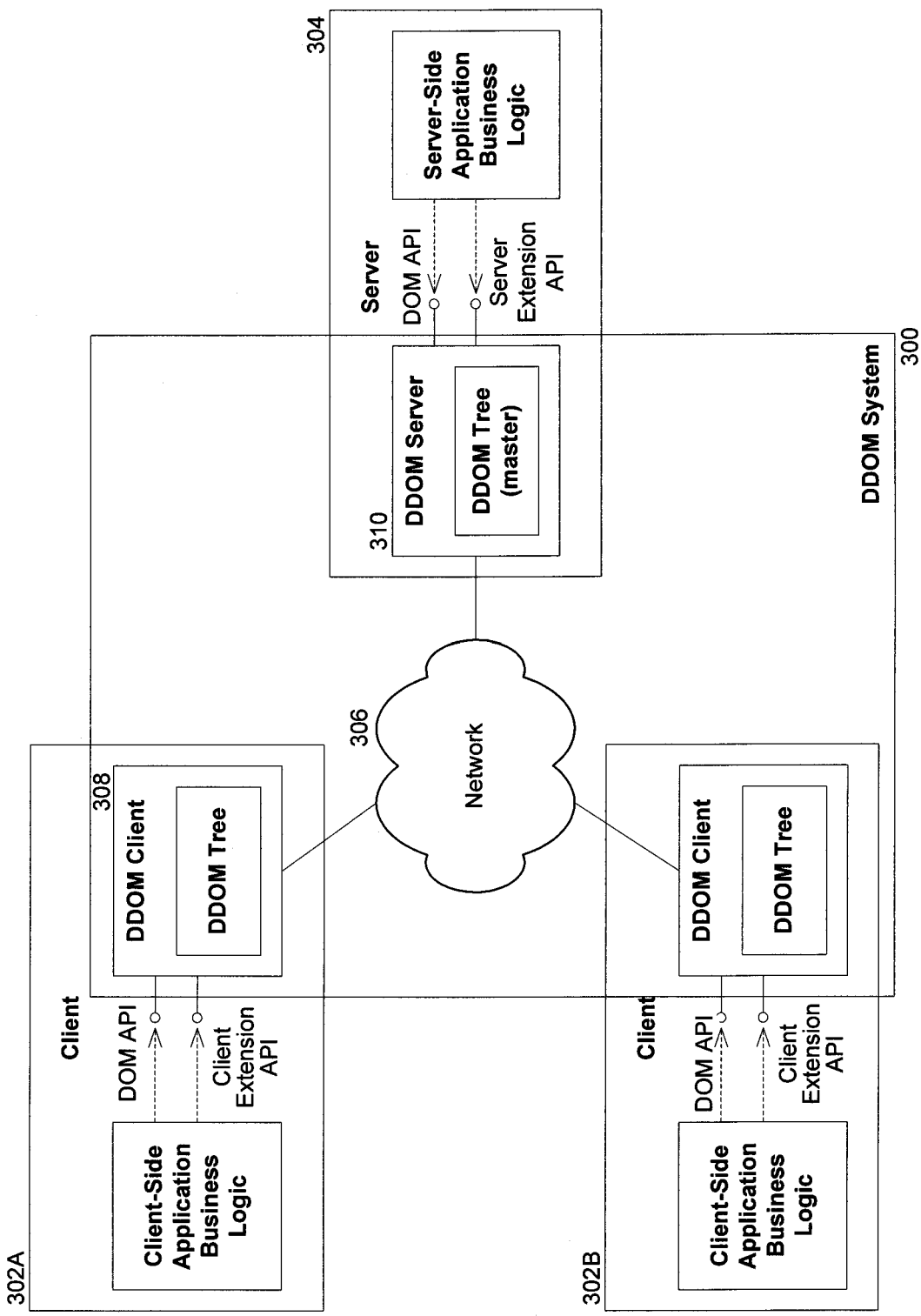
FIG. 3 is a block diagram illustrating an embodiment of the components of the system.

Turning now to the figures, FIG. 3 is a block diagram illustrating components of an embodiment of the DDOM system. The system 300 includes one or more clients 302A, 302B, a server 304, and a network 306. One skilled in the art will recognize that even though a single network and server are illustrated, there may be multiple networks, sub-networks, or servers in the system. As an example, a client may be behind a firewall in an intranet system, yet be communicating over an Internet to the server, which in turn may be on a separate intranet. The client and server may be any of a variety of forms of computing systems. As examples, a client may be a personal computer, personal digital assistant, advanced cellular telephone, or a pocket computing device.

As further examples, the server may be a personal computer, mainframe computer, or minicomputer. One skilled in the art will recognize that computing devices of different forms and on separate communication networks are capable of communicating with one another to send or retrieve various forms of data. Each DDOM client component 308 of a client has a DDOM document that is a copy of the server's master version of the document. This master version is handled by the DDOM server component 310 of the server. The master version of the document and the clients' copies are represented as tree structures. The DDOM client and DDOM server components expose the DOM API and DDOM's extensions to the API. In this embodiment, the DDOM client components, DDOM server component, and network comprise the DDOM system.

Figure 4:
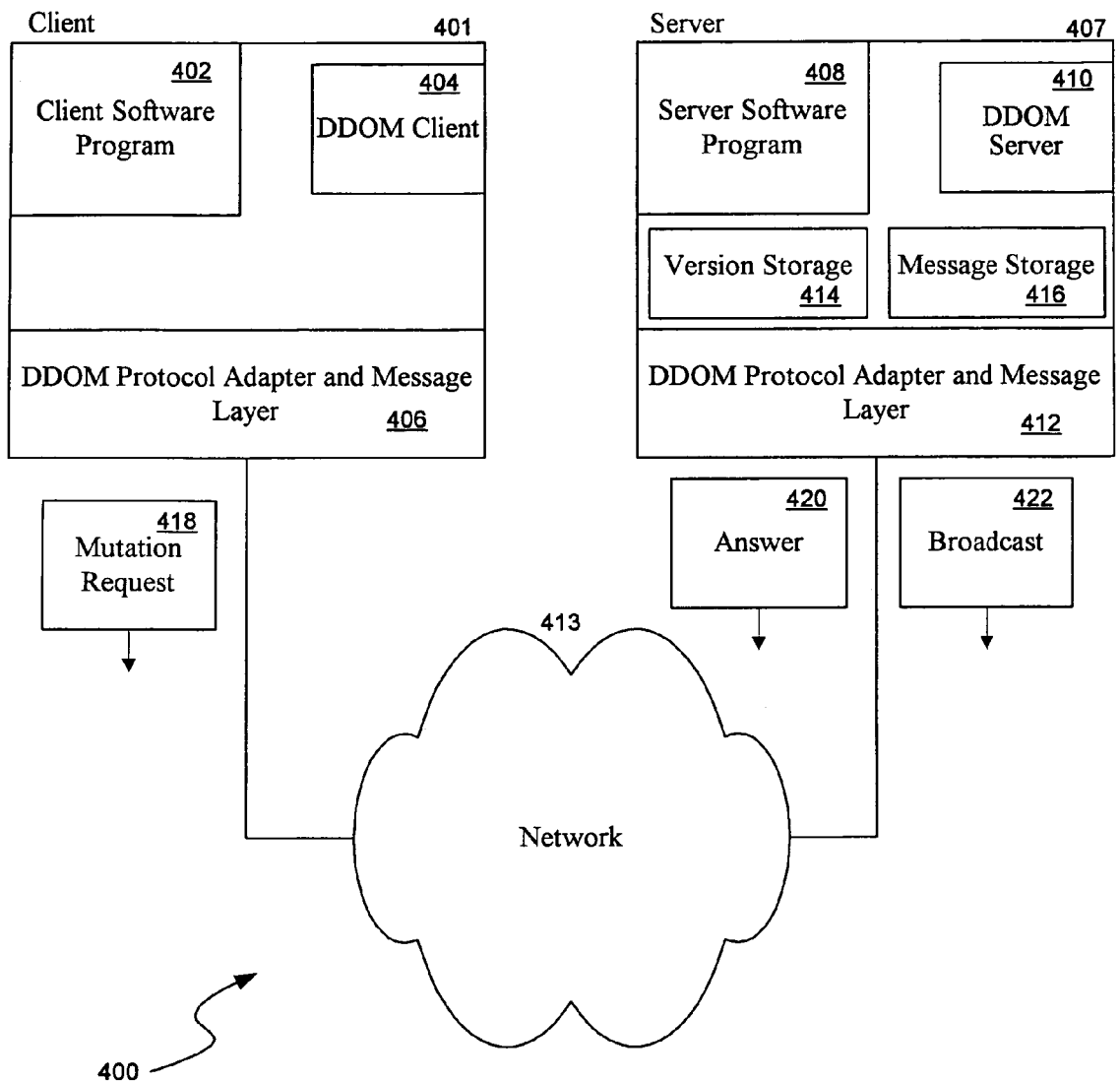
FIG. 4 is a block diagram illustrating the components of FIG. 3 in more detail and illustrating some communications occurring in the system.

FIG. 4 is a block diagram illustrating further details and components of the system illustrated in FIG. 3. In the embodiment of the DDOM system 400 illustrated, a client 401 comprises a client software program 402, a DDOM client component 404, and a DDOM Protocol Adapter and Message Layer 406. The client software program may be, e.g., a word processing program, a graphics editor, or any arbitrary editor of XML or other hierarchical documents. The DDOM client component performs various client-side processing functions of the DDOM system including managing the client's copy of the DDOM document. The client software program may use the DDOM system by subscribing to and using the API provided by the DDOM client component.

Subscribing to the DDOM system includes instantiating a DDOM document on a client and synchronizing with the document's master version, which may be located in a server. Synchronizing includes changing the client's copy of the document as per instructions received from a server that are designed to make the client's copy similar to the master version of the document.

Communications between a client and a server in the DDOM system may be in the form of messages, which may be in XML form. These messages include, e.g., mutation requests from clients to a server, answers from the server to the requesting client, and broadcasts from the server to clients. DDOM messages are exchanged between a DDOM client component and a DDOM server component.

The client software program may make all DOM-related requests through the DDOM client. The DDOM client may send Mutation Requests 418 to the server 407 through the DDOM protocol adapter and message layer. Such communications between client and server components may occur over a network 413. A DDOM client issues Mutation Requests to a DDOM server 410 for a document. The Mutation Requests may contain, among other things, a document identifier, a client identifier, and one or more mutations. Client and document identifiers may not be provided in all Mutation Requests, but this information may be available to client and server message processors from prior requests. The DDOM Protocol Adapter and Message Layer may package requests made by the DDOM client into frames or packets that are acceptable by the communications protocol being used to communicate with the server. As an example, if the request has 1024 Kb of data but the protocol accepts a maximum payload of 128 Kb, the DDOM Protocol Adapter and Message Layer may break the request down into several packets or frames of 128 Kb each. Similarly, the DDOM Protocol Adapter and Message Layer of the client may accept information from the server and convert it into a form acceptable by the DDOM client. This may include assembling several packets or frames into a larger DDOM message.

The server includes a server software program 408, a DDOM server, a DDOM Protocol Adapter and Message Layer 412, a Version Storage 414, and a Message Store 416. The server software program may or may not be related to the client software program. The server software program is a server-side application program that may provide enhanced functionality relating to a hierarchical document that is being authored by a user at a client. As an example, the server software program may enforce business logic that causes further mutations to the document based on the requested mutations. The DDOM server component performs various server-side processing functions of the DDOM system including managing the server's master version of the DDOM document.

A DDOM client may send a Mutation Request 418 to the DDOM server based on a mutation made by a user of the client software program. When the Mutation Request from the client arrives at the server, the DDOM Protocol Adapter and Message Layer of the server may transform the arriving packets or frames into a form acceptable by the DDOM server.

The DDOM server may have event handlers that were registered by a server component such as the server software program. These event handlers may be called when the applied mutations cause events to be fired. As an example, if an employee attempts to submit an expense report exceeding $500, the server software program, previously having registered an event handler, may mutate the expense report's authorization section to, e.g., require a director's approval in addition to a manager's approval.

The server may further include a version storage that may be comprised of snapshots of the hierarchical document created at various times and a list of modifications made to the document. The server may also include a message storage that may be used to re-broadcast messages. The message storage may also be used in lieu of the list of modifications stored in the version storage. The list of modifications may be used with the snapshots to recreate a document as it existed at any time (described below).

The server, after making mutations to its master version of the document, may respond with an answer 420 to the requesting client containing information relating to whether the requested mutations were successfully applied or reasons for one or more failures and information relating to the state of the document as it currently exists on the server. The answer may also contain information relating to further mutations made by the event handlers that may have been caused as a result of the requests made by the client. The server may also send a broadcast 422 to clients indicating mutations that have been made to the hierarchical document. The broadcast message may be "pushed" by the server, or may be "pulled" by the client. Communications from the DDOM server to the DDOM client are converted into packets or frames transportable by the communications protocol underlying the DDOM Protocol Adapter and Message Layer. The underlying communications protocols may be, e.g., HTTP, TCP/IP, or UDP.

Both clients and servers may maintain a list of messages they send. As an example, clients may maintain a list of mutation requests and servers may maintain lists of answers and broadcasts. These lists may be kept to resend messages previously sent. A client may resend a mutation request if it fails to receive an acknowledgement from the server. A server may resend an answer if the client so requests or if it determines that the client did not receive the answer. The server may also maintain a list of broadcast messages for the purpose of resending broadcasts requested by a client. Messages sent from clients or servers may contain a sequence number to easily identify which messages are to be resent.

A client or a peer may periodically send "heartbeat" messages. These heartbeat messages may have the same structure as mutation requests but may contain no mutation requests and may contain an indication of the last message received at the client from the server or sent to the server. A heartbeat message may be used to keep a connection open between a client and server. A server may respond to heartbeat messages by sending all mutations made to the master document that the client may not be aware of.

The DDOM Protocol Adapter and Message Layers on the client and server may also attempt to detect and correct for the loss of messages. Messages may be lost as a result of an unreliable protocol layer underlying and being used by the system. The DDOM Protocol Adapter and Message Layers may attempt to guarantee delivery of messages by using sequence numbers. As an example, if a DDOM protocol adapter and message layer receives a message sequence number 10 after a message sequence number 8, the layer may recognize that message sequence number 9 has been lost and may request redelivery of that message. As another example, a client-side DDOM protocol adapter and message layer, after having sent a request to a server-side DDOM protocol adapter and message layer, may wait for a certain period of time for an answer. If that time elapses without having received an answer, the client-side layer may assume that the message has been lost and may attempt to resend the message. As another example, the heartbeat message may contain information relating to messages that have been sent or received. The recipient of the heartbeat message may then be able to determine whether some messages have been lost and attempt to resend those messages. Either a client or a server that detects that a message has not been received or has detected that a series of messages have not been received, may attempt to recover these lost messages by sending a request to the other to request the missing message(s). In the unlikely event that a requested message cannot be resent, a response message may be sent indicating that the requested messages are not available.

Figure 5:
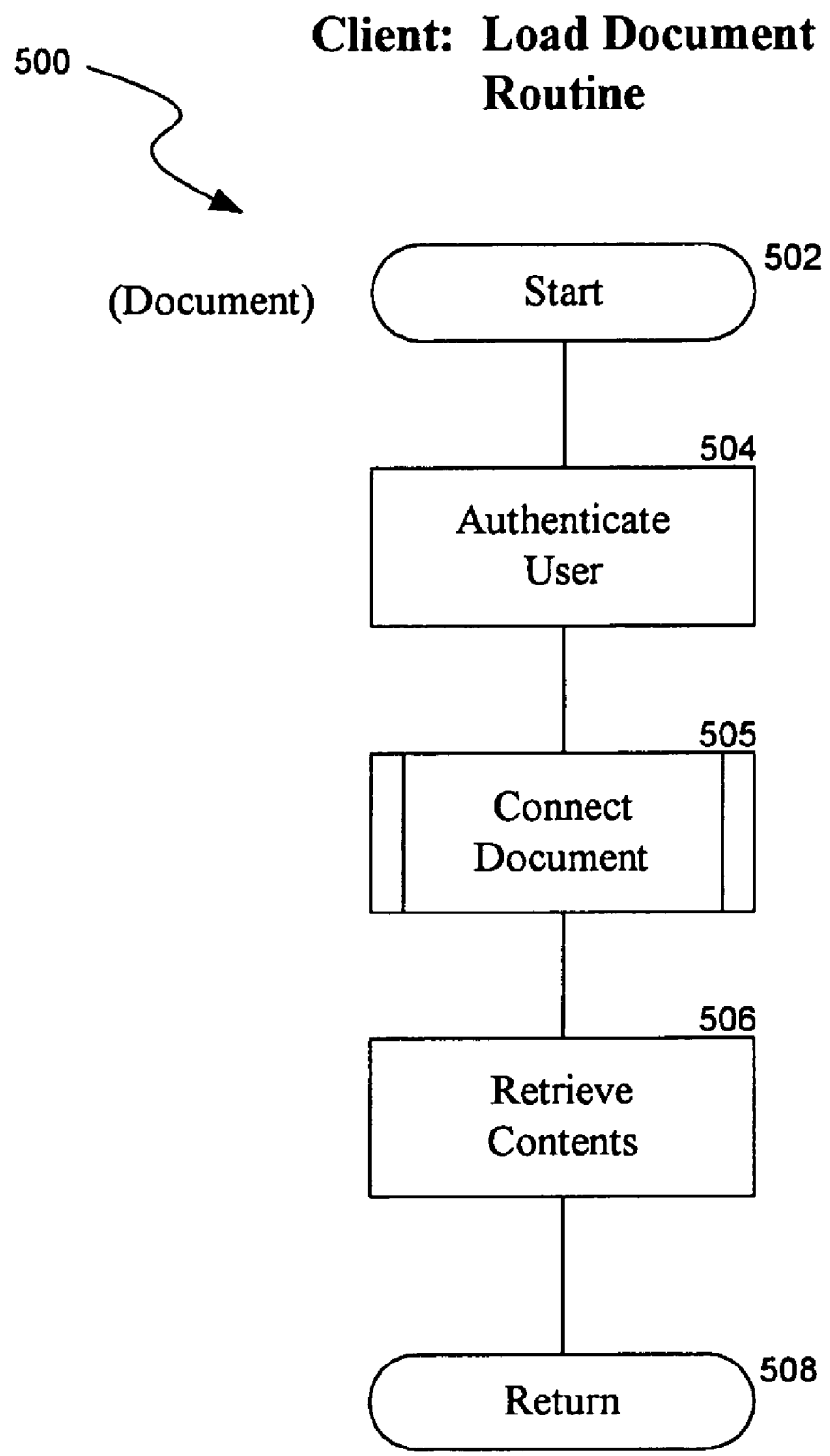
FIG. 5 is a flow diagram illustrating an embodiment of the Load Document routine.

FIG. 5 is a flow diagram illustrating an embodiment of the Load Document routine. The routine 500 is executed by the DDOM client when a client software program first requests to open of a document. The routine starts at block 502 and is provided with an indication of the document that is to be loaded. The routine may optionally authenticate the user at block 504. One skilled in the art will recognize that various forms of authentication may be used. The forms of authentication used may depend on the operating environment of the client, the server, and the client and server software programs. Authenticating a user may include, e.g., ensuring that the user is authorized to use the client, execute the software programs, or open the document. In an embodiment, if the user has no privileges relating to any node of the document, the user may receive an empty document. Alternatively, the user may receive an error. The routine may call the connect document subroutine at block 505, which is further described below. At block 506, the routine retrieves the contents of the document and ends at block 508.

The DDOM system supports a concept of lazy loading. Using this technique, a client may load only a subset view of the document (i.e., a pruned tree), and only load additional portions of the data as needed. When this is done, the client needs to recognize when a more complete view must be retrieved from the server to, e.g., apply a mutation to a portion of the tree the client does not presently have. In responding to mutation requests (described further below), the server may include context information sufficient to inform the client of a node's ancestry (i.e., its position relative to the document's root node). This context information may include sufficient information for the client to decide if it has the node and its ancestors. When a client recognizes that it has insufficient information relating to a node, it evaluates this ancestry information to determine whether it needs to request additional nodes of the document from the server. The server may use an aspect of the versioning feature (discussed above) to construct a representation of the tree to respond to a client's request.

In an embodiment, clients ignore broadcast messages from the server relating to nodes that do not appear in the portion of the document the client has loaded. In an embodiment, clients load portions of the document relating to received messages.

Figure 6:
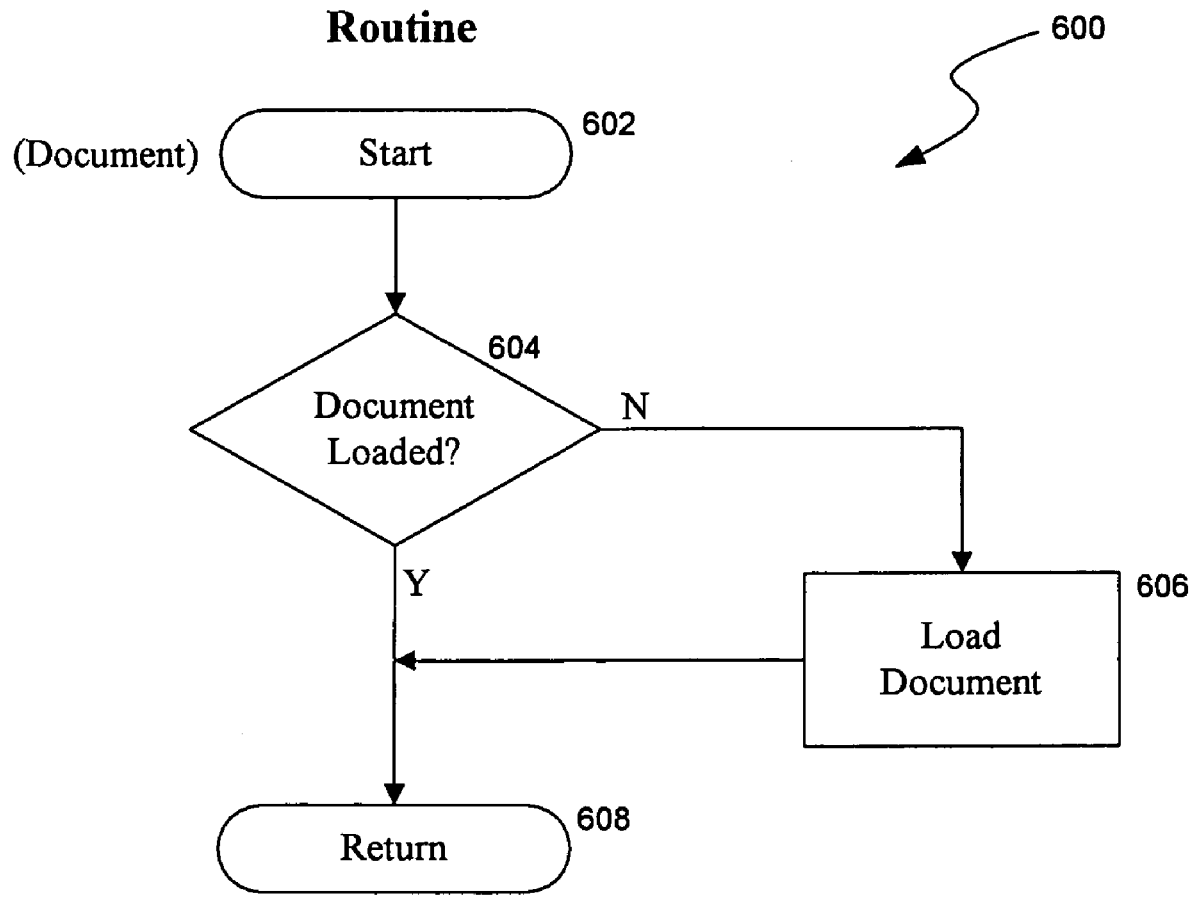
FIG. 6 is a flow diagram illustrating an embodiment of the Connect Document routine.

FIG. 6 is a flow diagram illustrating an embodiment of the connect document routine. The connect document routine 600 may execute on a server computing device when the system runs in a client/server environment. The routine may also run on any peer computing device when the system runs in a peer-to-peer environment. The routine begins at block 602 where it receives an identifier of a document as a parameter. At block 604, the routine determines whether the specified document has already been loaded. If the document has not already been loaded, the routine loads the document at block 606. Loading the document may involve reading a portion (or all of) the document from storage. The routine ends at block 608.

When a server serializes (i.e., stores) a document, node UIDs are serialized as node attributes on each of the nodes. In an embodiment, the attribute is named 'ddom:nodeID.' When document-unique node UIDs are used, the root element of the document may have an attribute named 'ddom:lastIDused' that holds the node UID that was used previously within the document. Each text node in the document is identified by an attribute in its parent non-text node named 'ddom:textNodesIDs' which contains a delimited list of node UIDs for each child text node in the order in which they appear. The DDOM system may also add additional attributes.

When a server de-serializes (i.e., loads) a document that a DDOM system has not previously serialized or de-serialized, it may contain no DDOM attributes. This situation triggers a handler which adds a 'ddom:nodeID' attribute to each node of the document and numbers each such attribute consecutively. A document that has been previously de-serialized has this attribute at all nodes with possibly the exception of nodes added by an external system. Such nodes are assumed to be new and are assigned consecutive node UIDs starting with the value 1+'ddom:lastIDused.' Text nodes are identified by attributes set in their parent node, as described above.

In an embodiment, node IDs are not sequentially numbered, but may comprise other unique indications including, e.g., alphanumeric characters. In such a case, the expression "1+'ddom:lastIDused'" refers to a subsequent unique node ID.

The DDOM system may also need to respond to various problems relating to DDOM documents. If a 'ddom:lastIDused' attribute is not found on the root element but it is found on some other element, the DDOM system assumes that another application outside the DDOM system has restructured the document in such a manner that the original root node has been moved deeper into the document. If a 'ddom:lastIDused' attribute is not found at all within the document, but other types of DDOM attributes are found, the DDOM system triggers an error. In such a case, the default behavior is to reject the input. However, if a handler is registered for the error, the handler may perform some other action to resolve the error.

An example of a persisted document appears below:

```xml
<?xml version="1.0" encoding="UTF-8"?>
<project xmlns:ddom="http://ddom.com/schema" ddom:nextNodeID="19"
ddom:nodeID="2" creationDate=" " ddomProjectDocID=" " new="true"
projectOngoing="true" ddom:textNodesIDs="3;18"
ddom:textNodesLockBagIDs="-1;-1">
    <ddom:lockBags/>
    <document ddom:nodeID="4" creationDate=" " currentDraftNo="0"
documentState="NotReady" name=" " nextDraftNo="1" ddom:textNodesIDs="5;17"
ddom:textNodesLockBagIDs="-1;-1">
        <participants ddom:nodeID="6" ddom:textNodesIDs="7;16"
ddom:textNodesLockBagIDs="-1;-1">
            <current ddom:nodeID="8"
ddom:textNodesIDs="9;11;13;15" ddom:textNodesLockBagIDs="-1;-1;-1;-1">
                <authors ddom:nodeID="10"/>
                <administrators ddom:nodeID="12"/>
                <reviewers ddom:nodeID="14"/>
            </current>
        </participants>
    </document>
</project>
```

Figure 7A:
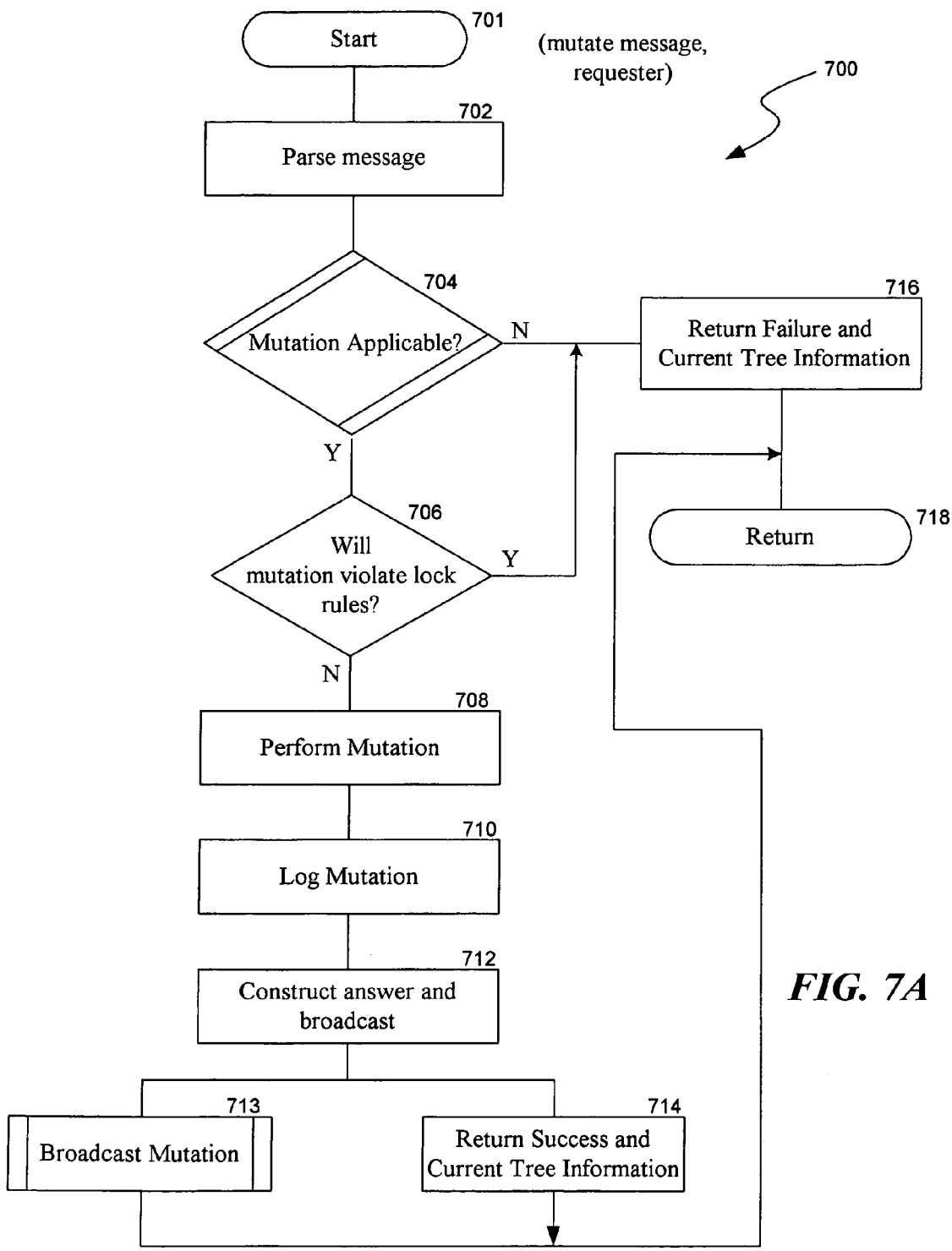
FIG. 7A is a flow diagram illustrating an embodiment of the Mutate Tree routine.

FIG. 7A illustrates a flow diagram for an embodiment of the Mutate Tree routine. This routine makes use of a node locking mechanism of the DDOM system.

The DDOM system defines an API for its node locking mechanism comprising several methods and properties. The following methods and properties relate to nodes: an isLocked() method that returns a boolean indication of whether the node is locked; a getLockholder() method that returns a string identifying the user who holds a lock on the node; a lock method whose parameters include the identification of a lock bag and a boolean indication of whether a deep lock is desired that returns an indication of whether the lock was successful or not, and pertinent other information such as the maximum lease time, remainder time of the lock, or failure codes or messages; an unlock method that accepts a boolean indication of whether a deep unlock is desired that returns a number of nodes unlocked; a get lock bag identification method that returns an identification of the lock bag containing the node; a hijack method which enables a user or process with a certain credential to "steal" a node or lock bag that has been locked by another user or process; and a canUnlock() method that returns an indication of whether the user calling the method has the necessary privileges to unlock the node.

The API relating to lock bags has several methods and properties including, e.g.: a get ID method returns an identification of the bag; a get name method returns an indication of the name of the bag; a get holder method returns an indication of the user holding the lock bag; a get remaining lease time method returns an indication of the amount of time remaining in the lease for the bag; a set bag characteristics method sets characteristics for the lock bag specified in its parameters; a get bag characteristics method returns a list of the characteristics that are presently set on the bag; a delete bag method deletes the lock bag; a lock node method accepts as parameters a node and a boolean indicating whether the lock should be deep and returns a results set relating to whether the lock was successfully placed; an unlock node method returns the number of nodes unlocked and receives as parameters a parent node and a boolean indicating whether the unlock should be deep; an unlock all method attempts to unlock all nodes and returns the number of nodes actually unlocked; a get nodes method returns a list of nodes; a get size method returns the number of nodes in the lock bag; and a renew lease method attempts to renew a lease on the lock bag and returns the amount of time for which the lease has been renewed.

The locking mechanism of the DDOM system may make use of a "bag characteristics" object. This object exposes an API to manipulate characteristics of locks, including, e.g.: maximum duration for which a lock can be maintained; time until a lock expires; when to notify clients of impending lock expiry; how an inserted node is treated; how a removed node is treated; whether the bag allows for a reduction in its maximum lease time when a node with a shorter lease time is added to the bag; a concept of "deep lock" modes wherein deep locks may include locks on a parent and its children nodes; whether a deep lock fails when it cannot lock all nodes in the subtree; and how lock bags are treated in regards to persistence when a user disconnects from the server (e.g., destroyed, persisted, or persisted when the lock bag is not empty). When a node is added to or removed from a lock bag, the lock lease time characteristic of the bag may be recalculated. As an example, when a node is added to a bag and that node has a lock lease time of 5 seconds and the lock lease time of the bag is 10 seconds, the lock lease time of the bag may be reduced to 5 seconds. Nodes have a lease time that may be specified for the node or inherited from a parent node. For example, when a node is moved to a new parent, the node may inherit a lock lease time from its new parent. While a lock lease time of a bag may be affected by the addition of a node, the bag's lock lease time may not be recalculated when the node is moved to a new parent.

There may also be additional method calls that are counterparts of similar calls in the DOM. As an example, the DOM has a "remove attribute" method call. Similarly, the DDOM system also offers a "remove attribute" method call. An exhaustive list of DOM method calls that are also implemented in the DDOM system is unnecessary as one skilled in the art would recognize that all DOM method calls can be implemented in a DDOM system.

The DDOM system may have method calls relating to nodes. As examples, there may be an InsertBefore method for inserting a node before a specified node. This method may take parameters such as information relating to the new node and a synchronization mode. A response from the server to the InsertBefore method may contain an indication of whether the insertion was successful, a position of the newly inserted node, and additional information relating to other mutations that may have been applied on the server. The operation may fail if the specified node was removed or has a parent that is different than the parent indicated in the client's copy of the document. Similarly, there may be method calls to replace a child node, remove a child node, and append a child node.

There may also be method calls relating to the entire document. As examples, there may be method calls for creating a lock bag, getting an identification of the owner of a bag, getting a bag's characteristics, getting a list of bags that are owned by the user, getting a list of bags, getting an indicating of whether a bag can be hijacked, and deleting a bag.

One skilled in the art would recognize that many of these methods require additional parameters that would be necessary to implement the method in various embodiments. One skilled in the art would also recognize that these methods may be invoked individually, together, or in various combinations.

Method calls invoked on a client may be transformed into DDOM messages for sending to a server and vice versa. As an example, when a client calls the get lock holder method, the DDOM client may send a message to the DDOM server to retrieve information relating to who the current holder of a lock is. When information requested is available locally at the client, the DDOM client may return the local information instead of requesting the information from the server.

When a server responds with its answer, it may return a positive or negative response. In the case of a client requesting information relating to the identification a lock holder, a positive response may include an identification of the holder of the lock. In this case, a negative response may be an indication of a server exception based on the fact that the client is not privileged to request such information. Similarly, when the client requests a lock on a list of nodes, the client may send the server an XML message identifying the nodes. In response, the server may answer with a list of the nodes that have been locked, or may respond with server exceptions. As another example, a client requesting to set characteristics relating to a lock bag may submit a list of the characteristics it desires to change in XML form. In response, the server may answer with a list of the characteristics actually changed. In this case, the server may respond with a different set of characteristics than those requested by the client. As an example, a client may request a lease duration of 30 seconds but the server may respond with a lease duration of 20 seconds.

The server may use the routine 700 to receive and process mutation requests from clients sequentially. Alternatively, the server may process requests from a given client sequentially, but may not guarantee that all requests from all clients are processed sequentially. In other words, whereas a server may process mutation requests from client A sequentially and may also process mutation requests from client B sequentially, it may process a later-arriving request from client B before an earlier request from client A, thereby interleaving the requests.

The routine 700 may run on a server computing device or a peer computing device that holds the master version of a document. The routine begins at step 701, where it receives as parameters a mutate message indicating mutations that are requested by the caller of the routine and an indication of the client that is making the request.

At block 702, the routine parses the mutate message received at step 701 to determine what mutations are requested. The routine may parse the message based on a message format that is associated with the client application that is using the DDOM system. The routine may transform the message into a canonical form that defines the information content that will be used to effect the mutation. At block 704, the routine determines whether the requested mutation is applicable. The determination of whether the mutation is applicable is a subroutine that is further described below in relation to FIG. 9. The subroutine may return an indication of TRUE or FALSE corresponding to whether or not the mutation is applicable. If the mutation is applicable, the routine continues at block 706. Otherwise, the routine continues at block 716.

At block 706, the routine determines whether the requested mutation will violate lock rules. As an example, a locked node may not be capable of being moved, and an attempt to move the node would violate a lock rule. If a lock rule will be violated by the mutation, the routine continues at block 716. Otherwise, the routine continues at block 708.

At block 708, the routine applies the requested mutation. If the requested mutation is to create a new node, the routine may create the new node in the tree, set the appropriate attributes, generate an ID for the newly created node, and assign the new node this ID. If the client is working in client before server tree update mode, the client may assign a temporary or local ID to newly created nodes at the client. Because the server assigns a new ID to newly created nodes, the ID assigned by the client may not be the same as the ID assigned by the server. However, it may be possible for the user to continue to mutate the tree at the client before the client receives a response from the server. Further mutations made by the user until such time may reference the client's local or temporary ID in subsequent messages to the server. As a result, the server may maintain a mapping of IDs created by clients to IDs assigned by the server. When the node creation at the server is successful, the server's answer to the client may include an indication that temporary IDs have been assigned new server IDs. Once the client has processed the response from the server, the client may refer to the new server-assigned ID when sending subsequent mutation requests to the server. Other examples of mutations requested by a client or a peer to a DDOM server component may include:

Insert node: inserts a node into the document structure;
Modify attribute: modifies an attribute; if the named attribute does not exist, it may be added;
Modify character data contents: modifies the contents of a CharData or CDATA type node;
Remove attribute: removes a specified attribute from the specified node;
Remove node: removes the specified node from the document structure;
Replace child: replaces a node in the document structure with a specified node; this node can either already exist in the document structure or be outside the document structure; or
Set attribute: modifies the value of a specified attribute; if the attribute does not exist, it is added.

The routine may lock the relevant portion of the tree using methods of the API described above so that the mutations can be made without interference from conflicting requests from other clients.

One skilled in the art will recognize that as additional methods are added to the DOM, additional related methods or messages may also be added to the DDOM to support similar functionality.

Messages containing commands may be sent either from the client to the server upon a user making mutations at the client, or may be sent from the server to a client for the client to incorporate mutations made by a user of another client. There may be differences in the parameters or message data based on whether the messages or commands emanate from a client or a server. As an example, when a client creates a new node, the client may assign and identify a temporary or local ID as described above. However, when the server sends a message to a client to create a new node, the server may already have assigned an ID to the newly created node and so further use of a temporary ID may not be required.

At block 710, the routine may add an entry relating to the mutation(s) just made into a list of mutations made to the tree. The entry may be added to a version storage, message store, or both. (Version and message storage components were described above in relation to FIG. 4.) At block 712, the routine constructs an answer message and a broadcast message. The answer and broadcast messages may comprise information relating to the mutation and the current state of the document. The routine then may continue at both blocks 713 and 714 (e.g., as two threads). At block 713, the routine may call the Broadcast Mutation subroutine (which is further described below in relation to FIG. 8). At block 714, the routine sends the answer constructed at block 712 to the caller of the routine. After both blocks 713 and 714, the routine continues at block 718.

At block 716, the routine returns a failure to the caller of the routine, and includes relevant other information. Other information may include information relating to mutations that have been made to the tree by this and other requests. As an example, sufficient information may be provided to synchronize the document of a caller of the routine with the master version. The routine ends at block 718 and returns execution to its caller. In an embodiment, the routine does not return until performing both blocks 713 and 714.

Figure 7B:
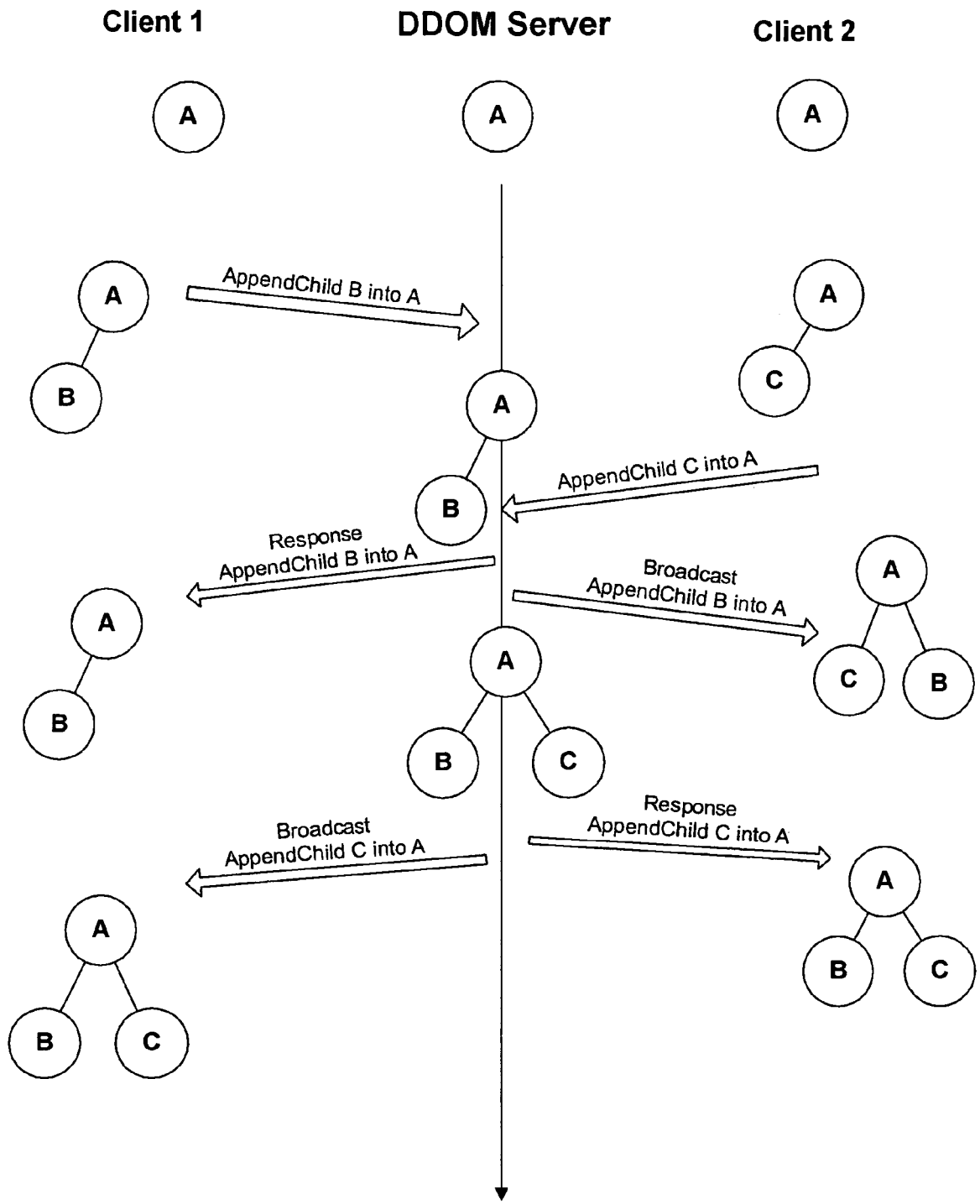
FIG. 7B is a block diagram illustrating an embodiment of how the DDOM system may handle multiple mutation requests to add a node to a document.

FIG. 7B is a block diagram illustrating how addition of nodes to a document are communicated between a server and clients in an embodiment of the DDOM system. In the illustrated example, initially two clients and a server all have a node, "A," in a hierarchical document. Subsequently, a user of the first clients add a node, "B," as a child of node "A." At the same time, a user of the second client adds a node "C" as a child of node "A." When a client adds a node, the client requests the addition of the node to the server, as described above. Suppose the request from the first client arrived at the server before the request from the second client. In such a case, the server determines that node "B" has been added as a child of node "A." The server communicates the successful addition of node "B" to the first client and broadcasts the addition to all other clients—here the second client. When the second client receives the broadcast from the server, it adds node "B" as a second child of node "A." However, because the server processed the request from the first client before the request from the second client, node "C" is the second child of node "A" in the master version of the document at the server, in contrast to the second client's local copy. The server then returns an indication of successful addition of node "C" to the second client. However, the server also indicates a position of node "C" in that message such that the second client is able to rearrange the children of node "A" in its local copy of the document in such a manner that the document continues to be a consistent reflection of what is on the server. The server then broadcasts the addition of node "C" to all the other clients—here, the first client. The broadcasts and responses sent by the server may contain positional information relating to the tree mutations requested by the clients.

Figure 7C:
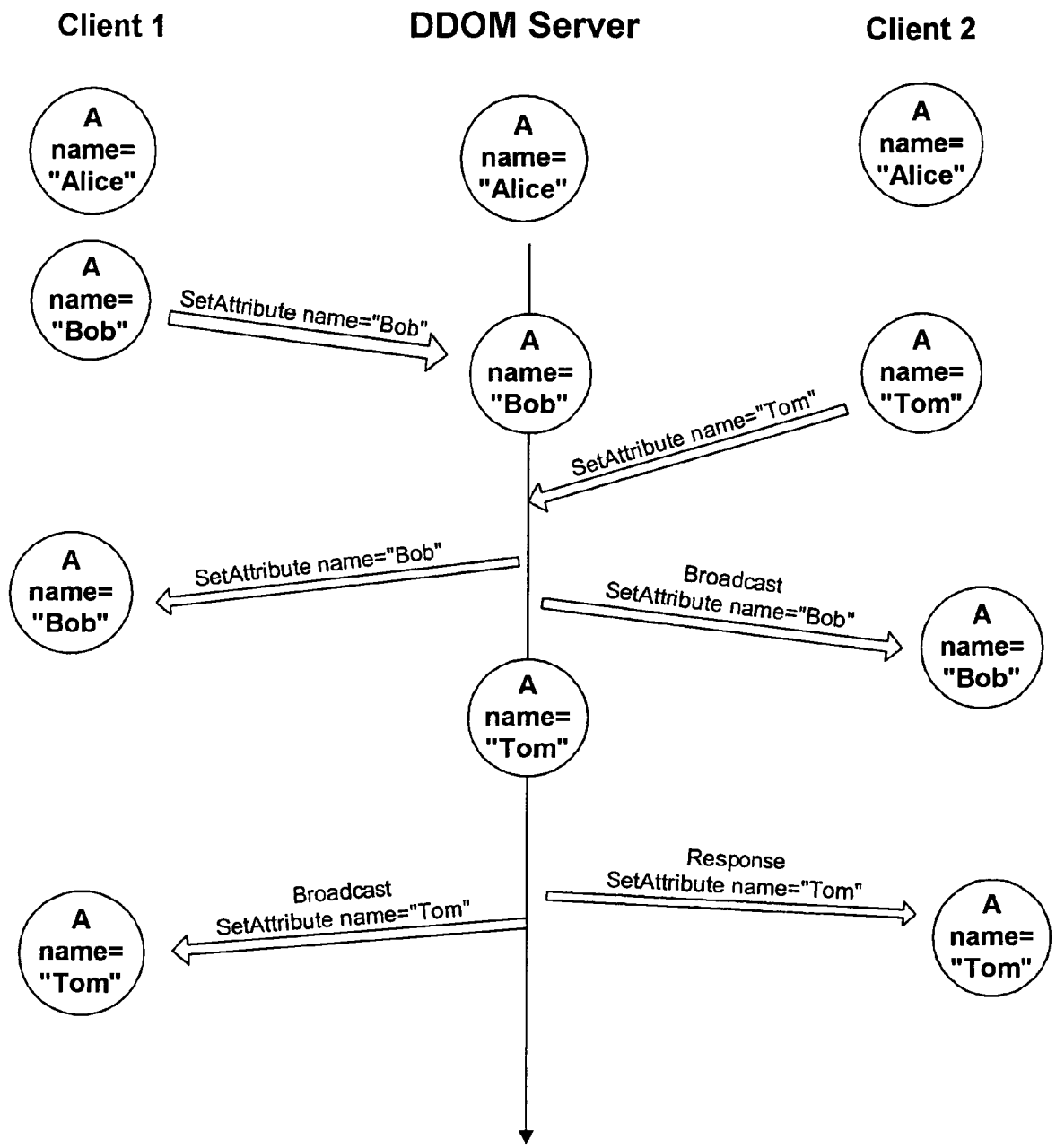
FIG. 7C is a block diagram illustrating an embodiment of how the DDOM system may handle multiple mutation requests to change the value of an attribute of a node of a document.

FIG. 7C is a block diagram illustrating how mutations to a document relating to attributes of a node are handled by a server in an embodiment of the DDOM system. In the presented example, two clients and a server have a hierarchical document with a node "A" that has a "name" attribute, which is set to "Alice." Suppose a user of the first client changes the attribute to "Bob." This client subsequently sends a mutation request to the server. Suppose further that a user of the second client also changes this attribute to "Tom" at the same time and this request is received by the server after the mutation request from the first client. The server may send an indication of success to the first client, and broadcast the mutation to all the other clients. The server may next handle the mutation request from the second client and change the attribute value to "Tom." The server would then send an indication of success to the second client and broadcast the attribute change to all the other clients. Because the attribute change from the second client was handled after the attribute change from the first client, both clients and the server now have "Tom" as the value of the "name" attribute. To ensure that all clients have a consistent document, responses to mutation requests may contain not only an indication of success, but also an indication of mutations made to the master version of the document on the server.

Figure 7D:
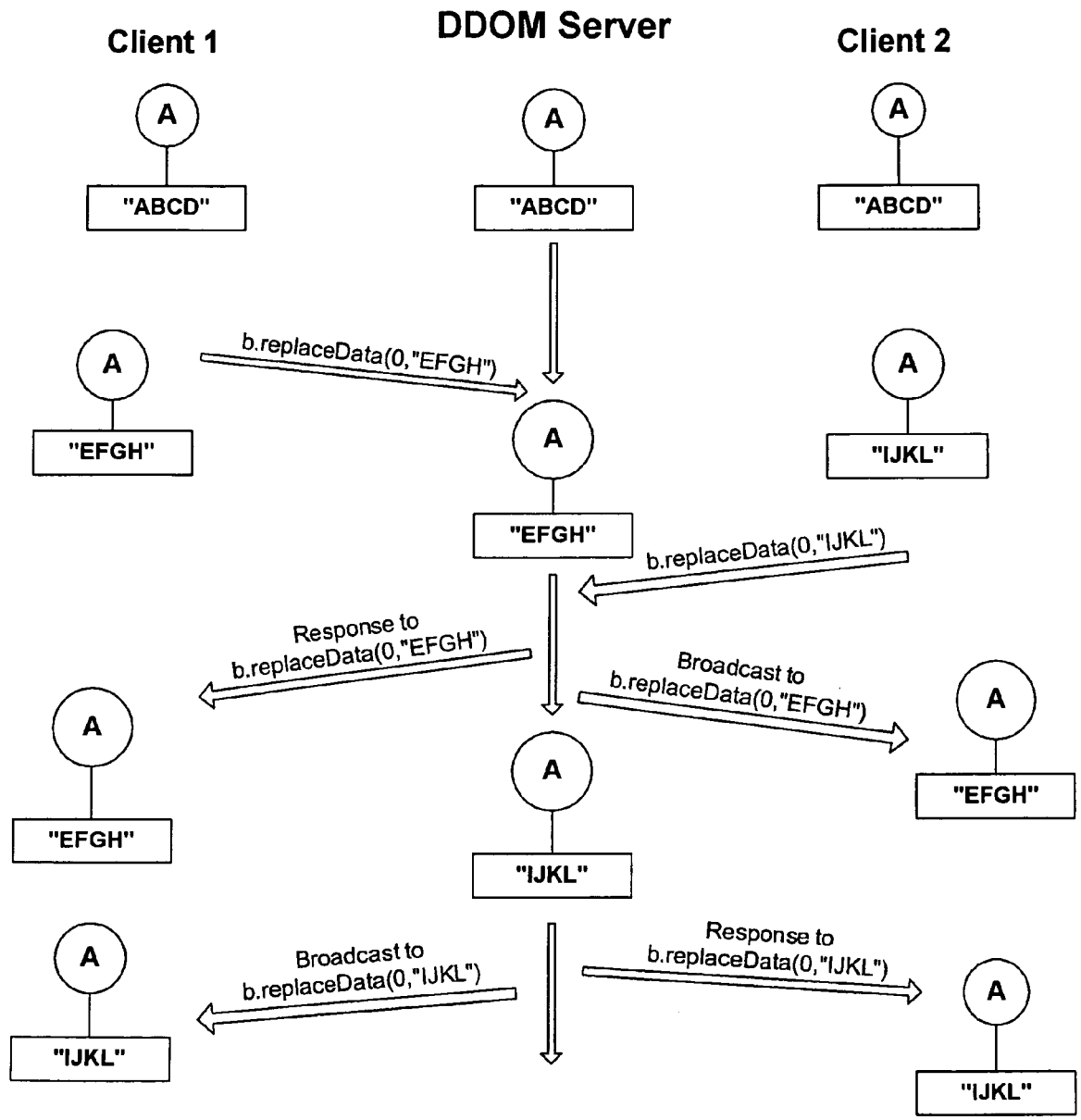
FIG. 7D is a block diagram illustrating an embodiment of how the DDOM system may handle multiple mutation requests to change the value of a data element in a document.

FIG. 7D is a block diagram illustrating how the DDOM system may handle requests for replacing data relating to nodes in a hierarchial document in an embodiment of the DDOM system. In the example illustrated, two clients and a server have a hierarchial document that contains a node "A" which has a related data value and which is set to "ABCD." Suppose a user of the first client changes the data value to "EFGH" and at the same time a user of the second client changes the value of the same data element to "IJKL." Further suppose that the mutation request from the first client arrives at the server before the mutation request from the second client. The server may send an indication of a successful mutation to the first client and broadcast the mutation to the second client. After this occurs, the server and both clients reflect a data value of "EFGH." Subsequently, the server may process the mutation request from the second client. After making the change on its master version of the document, the server may send an indication of success to the second client and broadcast the mutation to the first client. The broadcast and the indication of success may contain an indication of the new value for the data element. After both clients incorporate the mutation sent by the server, both clients and the server again reflect consistent values for the data element.

Figure 8:
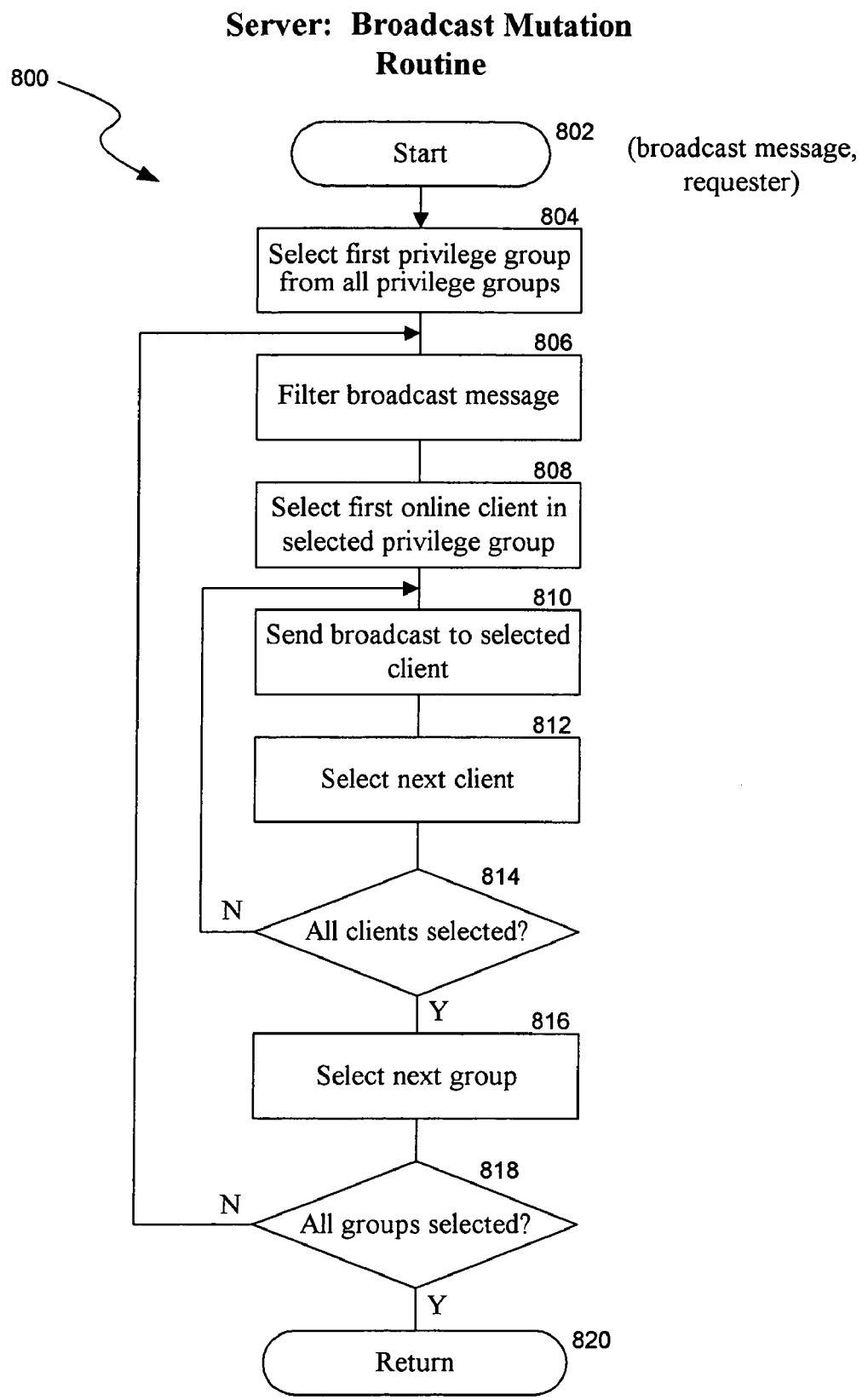
FIG. 8 is a flow diagram illustrating an embodiment of the Broadcast Mutation routine.

FIG. 8 illustrates a flow diagram for an embodiment of the Broadcast Mutation routine. The routine 800 begins at block 802 where it receives an indication of a broadcast message and a requester as parameters. At block 804, the routine selects the first group from the list of privileged group relating to the document. At block 806, the routine filters the broadcast message according to the privileges of the selected privileged group. As an example, if the selected group does not have sufficient privileges to read a node appearing in the broadcast message, that node would be removed from the broadcast message. Prior to creating a filtered broadcast message, the routine may first determine whether any client in the selected privileged group is currently online. At block 808, the routine selects the first client in the selected privileged group that is presently online. At block 810, the routine sends the filtered broadcast message to the selected client. The routine may not send the filtered broadcast message to the selected client if the selected client is the requester.

At block 812, the routine selects the next client in the selected privileged group. If at block 814 there are no more online clients, the routine continues at block 816. Otherwise, the routine continues at block 810. At block 816, the routine selects the next privileged group. If at block 818 there are no more privileged groups, the routine continues at block 820. Otherwise, the routine continues at block 806. At block 820, the routine returns execution to its caller.

Figure 9:
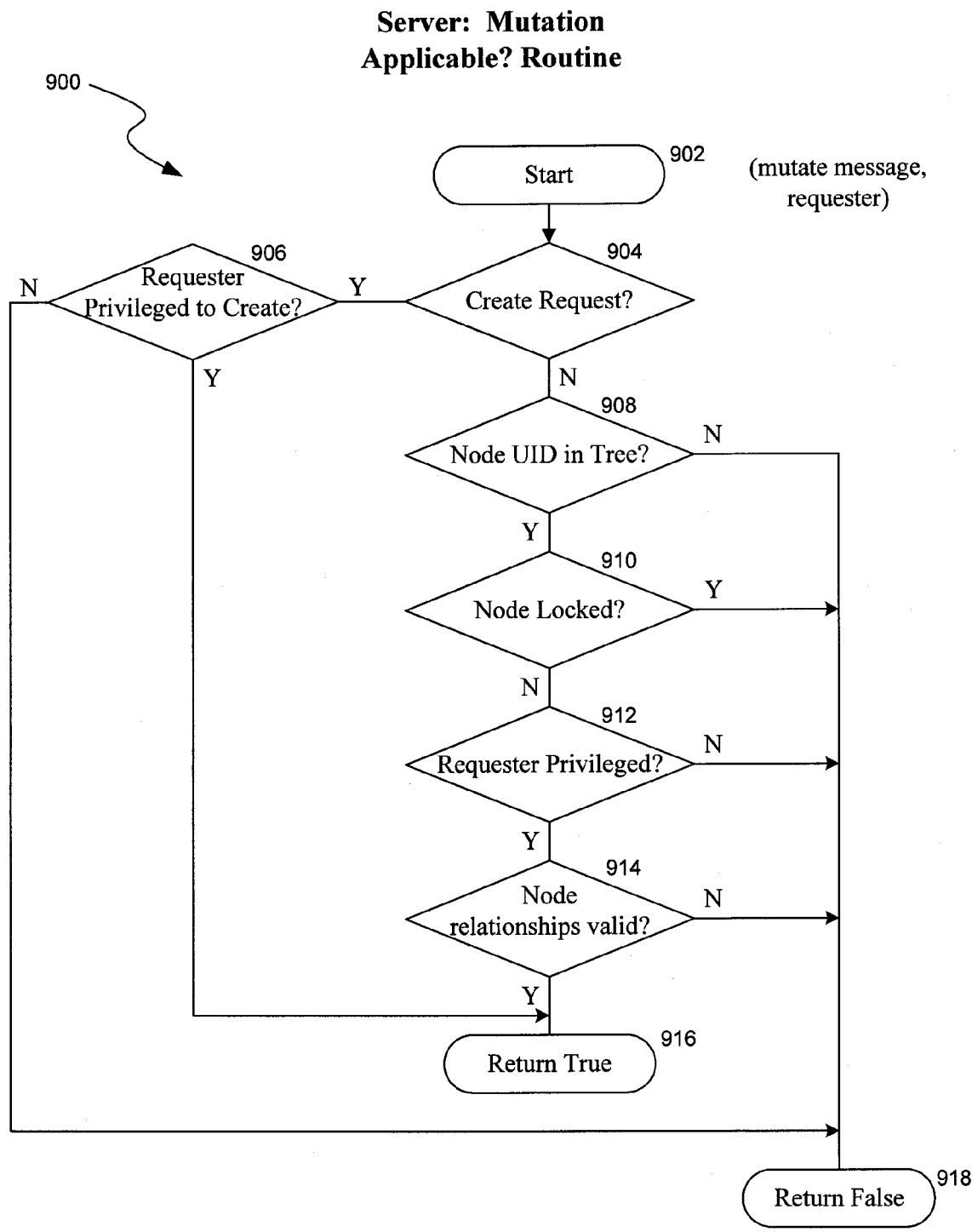
FIG. 9 is a flow diagram illustrating an embodiment of the Mutation Applicable? routine.

FIG. 9 illustrates a flow diagram for an embodiment of the Mutation Applicable? routine. This routine determines whether a requested mutation is applicable. The routine 900 begins at step 902, where it receives a message indicating the requested mutation and the client requesting the mutation as parameters. The mutation message may contain several mutation requests. If that is the case, the routine may check the applicability of each mutation request individually. At block 904, the routine determines whether the requested mutation is a "create" request. If that is the case, the routine continues at block 906. Otherwise, the routine continues at block 908. At block 906, the routine determines whether the requester has sufficient privileges to create a node of the requested type. The routine may check server-side business logic associated with the document to determine whether the node should be created. As an example, an engineer may not be authorized to create a new account to which expenses are charged. If the node can be created, the routine continues at block 916. Otherwise, the routine continues at block 918.

The routine determines at block 908 whether a node ID specified in the requested mutation is in the the hierarchical document. If the node UID is not in the document, the routine continues at block 918. The server may receive and recognize both clients' local node UIDs and server node UIDs. If the node UID is in the tree, the routine continues at block 910. As described above in relation to FIG. 7, a client may create a node locally and assign a temporary node UID to the node. The server may or may not have seen the temporary node UID from the client. The server may assign a node UID to the new node when the server adds the node to its master version of the document. The server may also maintain a mapping from temporary node UIDs to server-assigned node UIDs. It may do this because the client may send additional mutations relating to the new node before receiving an indication from the server that the server has assigned a node UID to the node. Once the server recognizes that the client knows about the server-assigned node UID, the server may remove the mapping for the temporary node UID.

At block 910, the routine determines whether the mutation request violates any conditions of the DDOM locking system. As an example, an attempt to perform a node insertion on a node that is locked by another client, may be rejected. If that is the case, the routine continues at block 918. Otherwise, the routine continues at block 912. At block 912, the routine determines whether the requester has sufficient privileges to make the requested mutation. As an example, the requester may not be able to change an attribute relating to a node if the user is a member of a privileged group that only has read access to the node. If the requester is not privileged to make the requested mutation, the routine continues at block 918. Otherwise, the routine continues at block 914, where the routine determines whether node relationships indicated in the mutation request remain valid in the master version of the document. As an example, if the mutation request is to insert a node relative to a second child of a parent, the routine may determine whether the indicated child is still a child of the parent. If the relationship is still valid, the routine continues at block 916. Otherwise, the routine continues at block 918. At block 916, the routine returns an indication that the requested mutation is applicable. At block 918, the routine returns an indication that the requested mutation is not applicable.

Figure 10A:
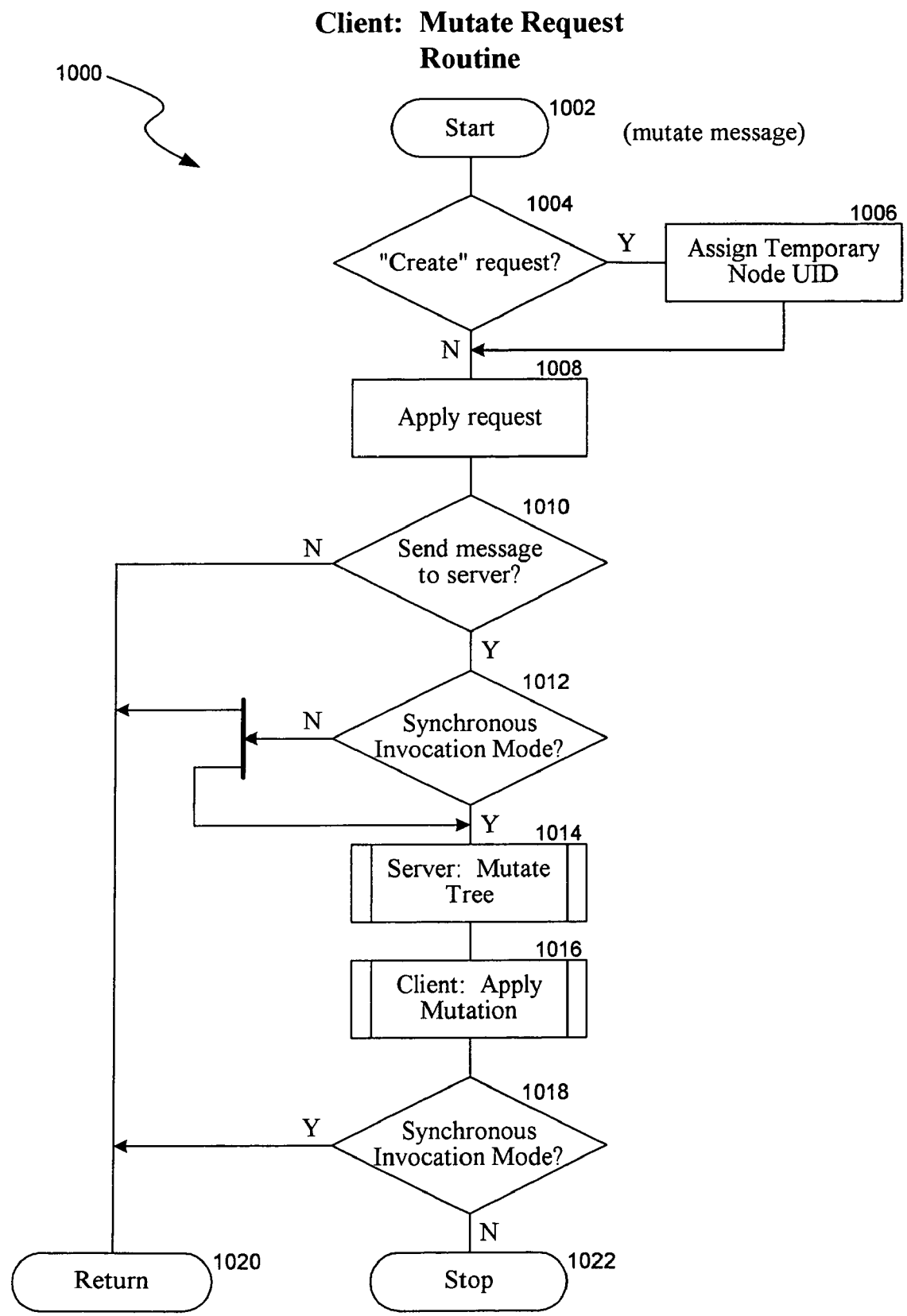
FIG. 10A is a flow diagram illustrating an embodiment of the Mutation Request routine.

FIG. 10A illustrates a flow diagram for an embodiment of the Mutate Request routine. The routine 1000 begins at step 1002, where it receives an indication of a message containing a requested mutation as a parameter. At block 1004, the routine determines whether the received mutate message contains a "Create" request. If that is the case, the routine continues at block 1006. Otherwise, the routine continues at block 1008. At block 1006, the routine assigns a temporary node ID to the newly created node. The temporary node ID is used by the client in subsequent messages to or from the server in relation to the newly created node until such time as the server provides a node UID. After the client receives the server's node UID, further messages relating to the node use the new node UID. At block 1008, the routine applies the requested mutation to the client's local copy of the document and may log the mutations applied to the local copy of the document in a local history. The routine may check the local history to determine an appropriate portion of the client's copy of the document to which to apply mutations (described further below in relation to FIG. 10B). At block 1010, the routine determines whether the mutation requires a message to be sent to the server. For example, mutation requests on DDOM fragments may not need to be sent to the server (e.g., because the DDOM fragment has not yet been added to the master version of the document.) If a message needs to be sent to the server, the routine continues at block 1012. Otherwise, the routine continues at block 1020. At block 1012, the routine determines whether the DDOM client is operating in synchronous invocation mode. If the client is operating in synchronous invocation mode, the routine continues at block 1014. Otherwise, the routine may launch a separate thread of execution to continue at block 1014 and return the present thread to the caller at block 1020. At block 1014, the routine calls the server: Mutate Tree Subroutine. This subroutine is described above in relation to FIG. 7A. This subroutine is performed at the server. At block 1016, the routine calls the Client: Apply Mutation Subroutine. This subroutine is described below in relation to FIG. 10B. At block 1018, the routine determines whether the DDOM client is operating in synchronous invocation mode. If that is the case, the routine returns to its caller at block 1020. Otherwise, because another thread has already returned to the caller after block 1012, the routine stops performing this thread at block 1022. Thus, under asynchronous invocation mode, a client-side business logic component may not need to wait for the DDOM client to receive a response from the server before the routine returns.

Figure 10B:
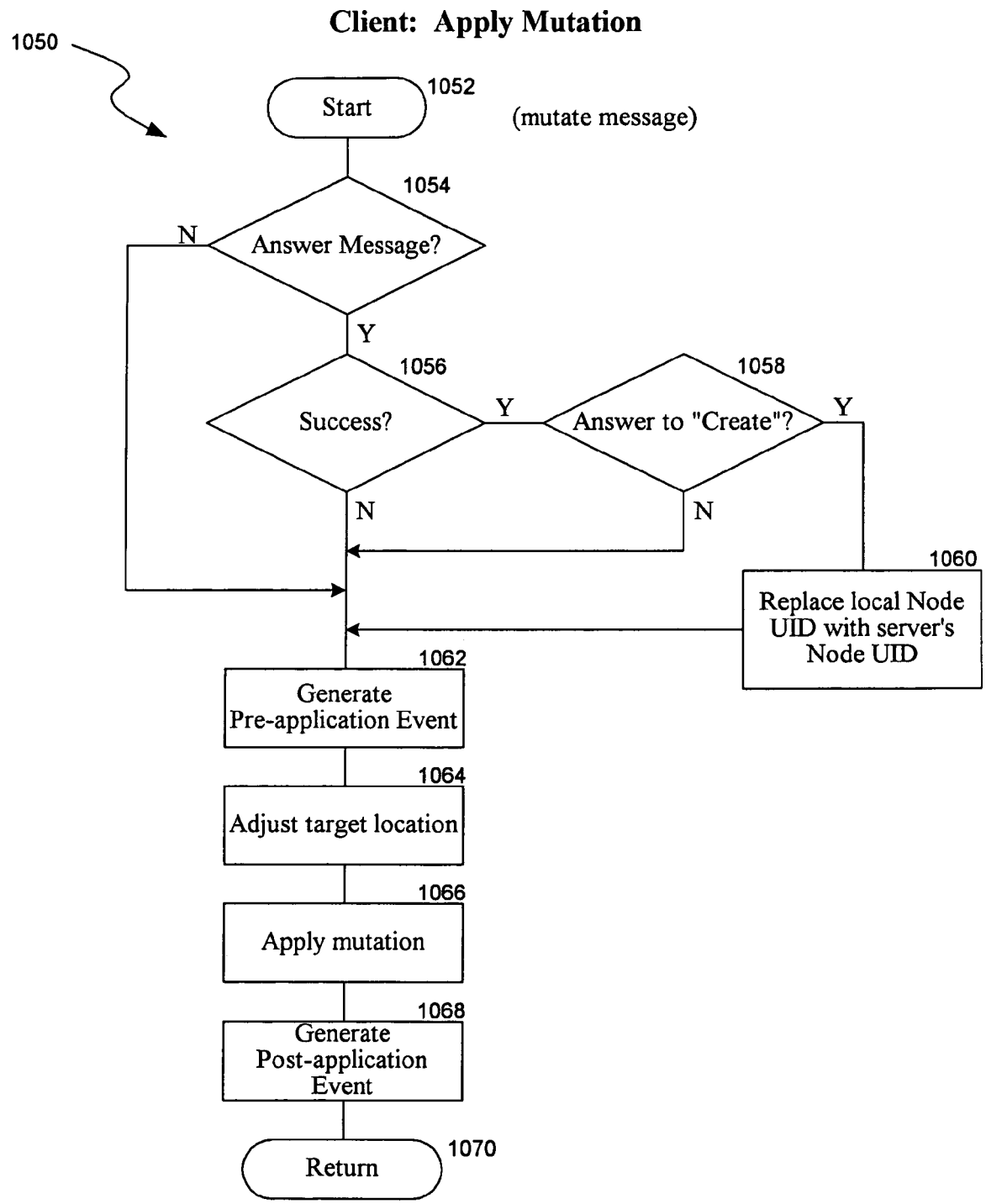
FIG. 10B is a flow diagram illustrating an embodiment of the Apply Mutation routine.

FIG. 10B illustrates a flow diagram for an embodiment of the Client: apply mutation routine. This routine applies mutations received in answer and broadcast messages to a client's local copy of a document. The routine 1050 begins at block 1052 where it receives an indication of a message containing a requested mutation as a parameter. This message may be received from a server in answer to a request from a client that is performing the routine or as a broadcast message possibly in response to another client's mutation request. At block 1054, the routine determines whether the message is an answer message or a broadcast message. If the message is an answer message, the routine continues at block 1056. Otherwise, the routine continues at block 1062. At block 1056, the routine determines whether the answer indicates that a message was successfully applied at the server. If that is the case, the routine continues at block 1058. Otherwise, the routine continues at block 1062. At block 1058, the routine determines whether the answer is in response to a "Create" request. If that is the case, the routine continues at block 1060. Otherwise, the routine continues at block 1062. At block 1060, the routine replaces the temporarily created local node UID with the server's node UID that is indicated in the answer.

At block 1062, the routine generates a pre-application event. A registered event handler may respond to such an event by performing activities such as causing further mutations or performing other client-side work. At block 1064, the routine may adjust the target location for the received mutation. The routine may adjust the target location when it is unable to interpret context information appearing in a message from the server. To adjust the target location, the routine may consult a local history of node movements that are results of client-side mutations applied in local before server tree update mode that are not yet acknowledged by the server. As an example, an "insert before" operation referencing a node that the client has moved may be processed by the client even though the server has neither processed nor acknowledged the mutation operation on the referenced node. As a further example, if the mutate message includes an instruction to insert a node A to the left of node C but the client has removed node C, the client may consult the local history to determine that node C previously appeared to the left of node D. As a result, the client may add node A to the left of node D.

At block 1066, the routine applies the received mutation on the client'local copy of the document. Either after blocks 1064 or 1066, the routine may clear information for the target of the mutation in the local history log and adjust the history log'records that refer to the target node as its positioning is now established based on the message from the server. This may be the same history log that may be used to adjust the target location at block 1064. At block 1068, the routine can generate a post-application event that indicates that a mutation was applied. The routine returns execution to its caller at block 1070.

The local history may be used to resolve simultaneous or independent mutations occuring to related nodes. A client operating asynchrounously in local before server tree update mode may use the local history to resolve problems that may occur when the server is unable to accept the client's mutation request or when the client receives a conflicting mutation from the server, such as to adjust the target location for a mutation (e.g., block 1064). As an example, suppose a document contains a subtree beginning at node R, which as children X, Y, and Z, and node X has children A, B, and C. The client may make a local mutation moving node B to become a child of node Y. Upon making the mutation asynchronously in local before server tree update mode, the client stores the locally applied mutation in the local history and sends a mutation request to the server. Before the server acknowledges the request, the client may receive a broadcast message from the server indicating that node Z is to be moved to become a child of node X to the right of node B. However, because node B is no longer a child of node X (and is instead a child of node Y), the client detects that the mutation from the server conflicts with the locally applied mutation. To resolve the conflict, the client determines from the local history that node B was previously a child of node X between nodes A and C. The client then determines that it can satisfy the mutation from the server by making node Z a child of node X between nodes A and C.

The local history comprises mutations initiated by a client. When a mutation results in the node having a new parent or right sibbling, aspects of the mutation may be stored in the local history. For each mutation, the local history may comprise a node to which the mutation was applied, the node's parent, the next sibbling to the right of the node, and other history-related content. When the client receives a mutation from a server specifiying a parent and right child of a node to which a mutation is to be applied, the client determines whether the local history contains an entry for the node. If the local history contains an entry for the node, the client may transfer the content in the local history relating to other nodes that have relationships to the node and removes the entry relating to the node. When a node is added to the local history, information relating to its right sibbling is also recorded. When the right sibbling also has an entry in the local history, the right sibbling's right sibbling is treated as being the node's right sibbling. The process of adding information relating to right sibblings may be performed recursively until no further right sibblings with entries in the local history are found. In an embodiment, other mutations may also be stored in the local history. In various embodiments, the left sibbling may be used instead of the right sibbling.

The client may process broadcast messages and answer messages differently. Broadcast messages may be considered to be directives from the server and may be processed without consideration as to whether they contradict local changes. Positive answer messages for node creation requests may require the client to map the node UID provided by the server to the temporarily created local node UID.

Figure 11:
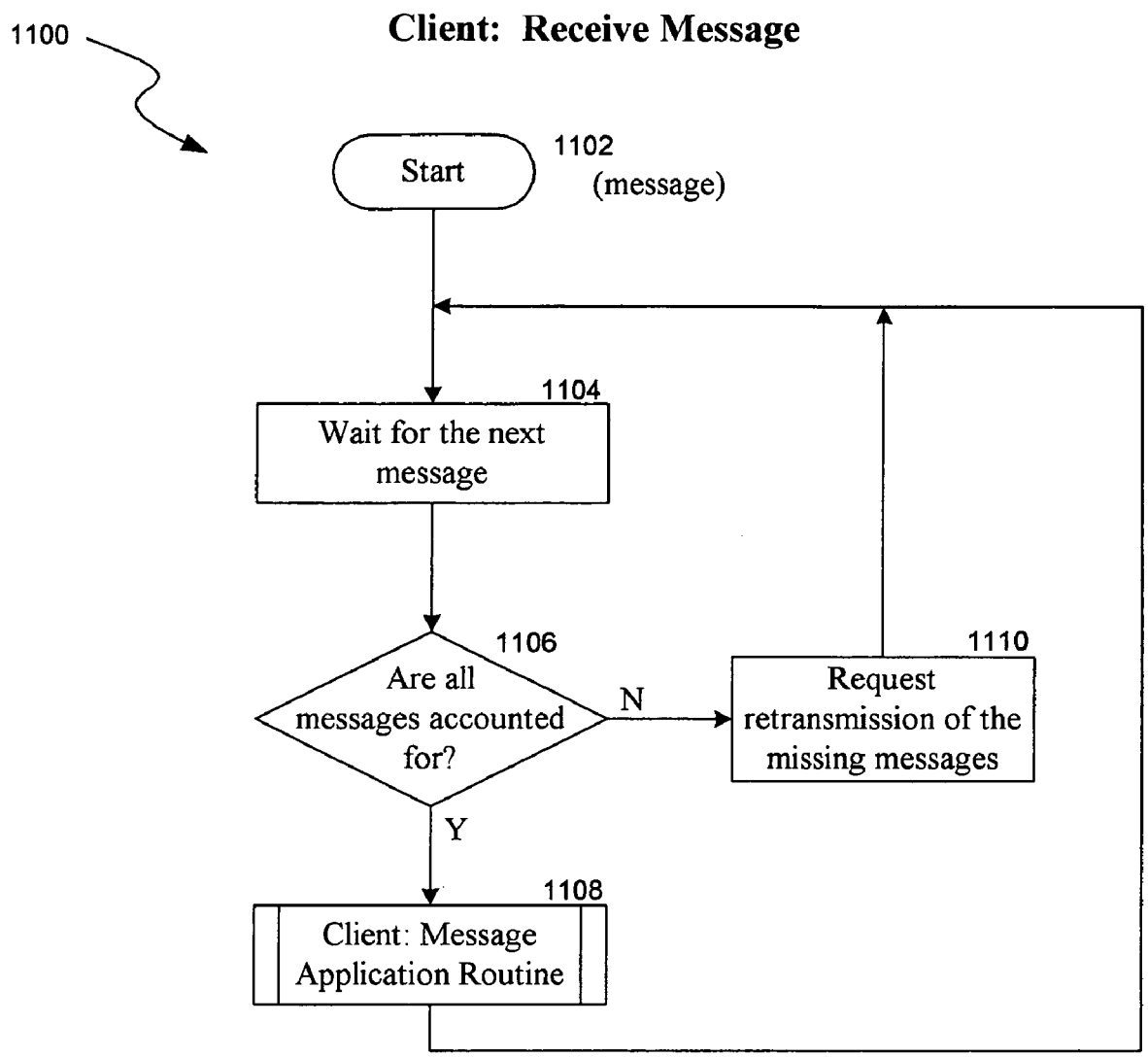
FIG. 11 is a flow diagram illustrating an embodiment of the Receive Message routine.

FIG. 11 illustrates a flow diagram for an embodiment of the Receive Message routine. The routine 1100 begins at block 1102, where it receives an indication of a message as a parameter. A message may comprise a header and a payload and may include content in various formats. Message content includes information content required for mutation requests. Message format is syntax employed to capture this information. Possible message formats include, e.g., ASCII, binary, and XML. At block 1104, the routine waits for the next message. At block 1106, the routine determines whether the received message is correctly ordered. If the message is correctly ordered, then all messages are accounted for and the routine continues at block 1108. Otherwise, the routine requests retransmission of missing messages from the server at block 1110. At block 1108, the routine calls the Client: Apply Mutation routine. A message may have an indication of an ordering. As an example, the message may contain a sequence number. The routine may track the sequence numbers of the received messages. If, e.g., sequence number 10 is received after sequence number 8, the routine may recognize that the message was not correctly ordered because sequence number 9 was missed.

At block 1110, the routine requests the missing broadcasts. As an example, the routine may request missing broadcast sequence number 9 when it receives sequence number 10 after sequence number 8.

Figure 12:
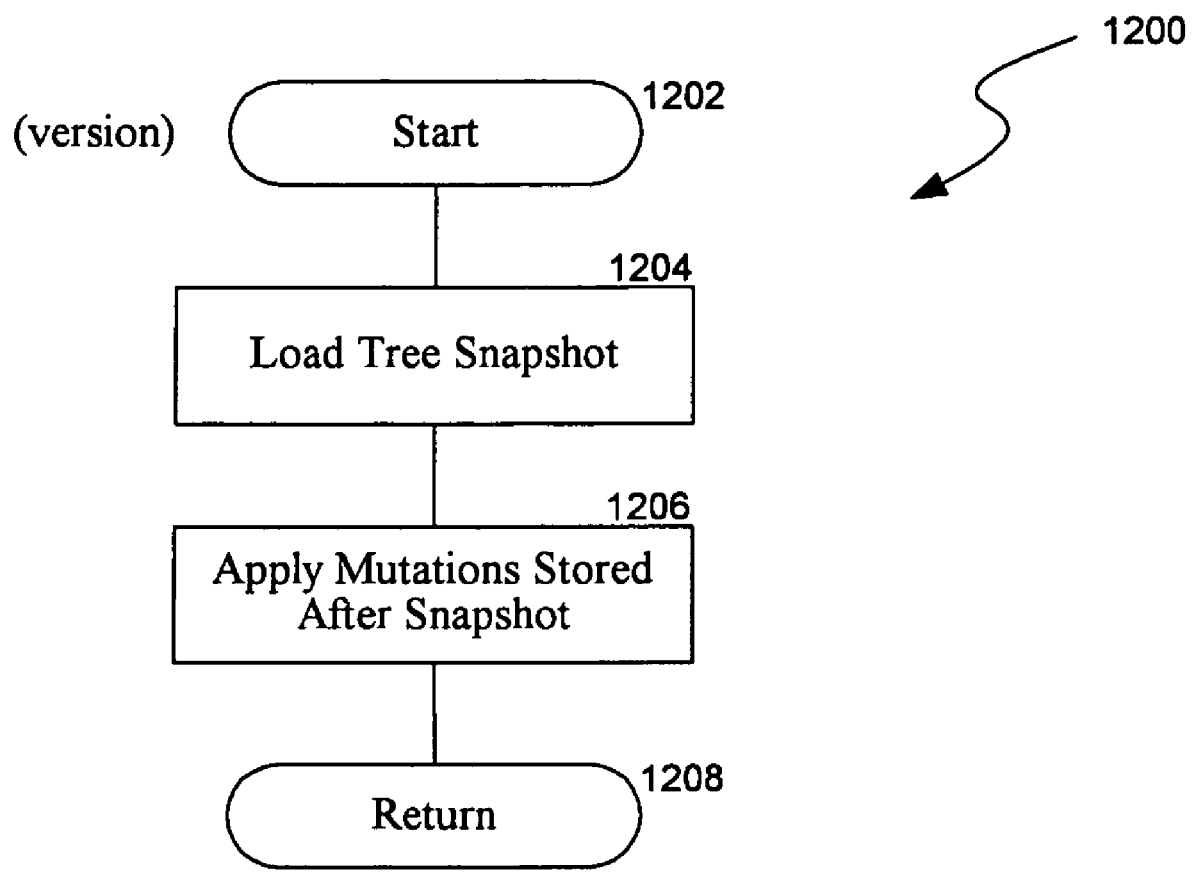
FIG. 12 is a flow diagram illustrating an embodiment of the Roll Forward routine.

FIG. 12 illustrates a flow diagram for an embodiment the Roll Forward routine. The routine 1200 begins at block 1202, where it receives an indication of a requested version of the document. At block 1204, the routine locates and loads a stored snapshot version from Version Storage 414 that is near the requested snapshot version. A snapshot version is nearer to a requested version than another snapshot version when, e.g., the difference in time between the specified version and the stored version is lower. A snapshot version may also be nearer to the requested version when the mathematical difference between the version numbers is lower. At block 1206, the routine applies all mutations made to the tree that were previously stored between the version of the snapshot and the requested version. As an example, if a requested version is Sep. 25, 2003, and the nearest snapshot is Aug. 12, 2003, the system may load the Aug. 12, 2003 snapshot and apply all mutations made to the tree between Aug. 12, 2003 and Sep. 25, 2003. The routine ends at block 1208.

Figure 13:
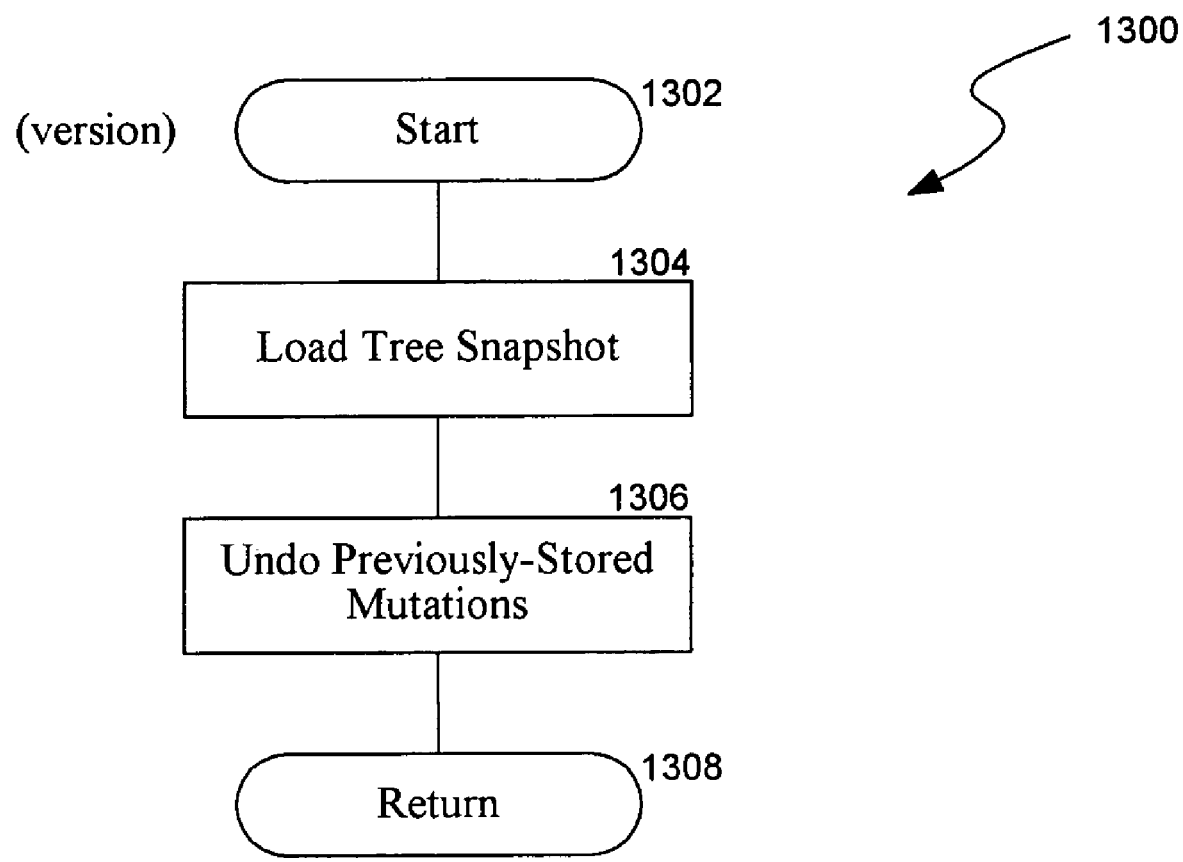
FIG. 13 is a flow diagram illustrating an embodiment of the Roll Back routine.

FIG. 13 illustrates a flow diagram for an embodiment the Roll Back routine. The routine 1300 begins at step 1302 where it receives an indication of a requested version. At block 1304, the routine locates and loads a stored snapshot from Version Storage 414 that is near the desired version. Determination of proximity of version numbers is discussed above in relation to FIG. 12. At block 1306, the routine undoes the effects of mutations between the loaded snapshot and the desired version. The routine ends at block 1308.

Figure 14:
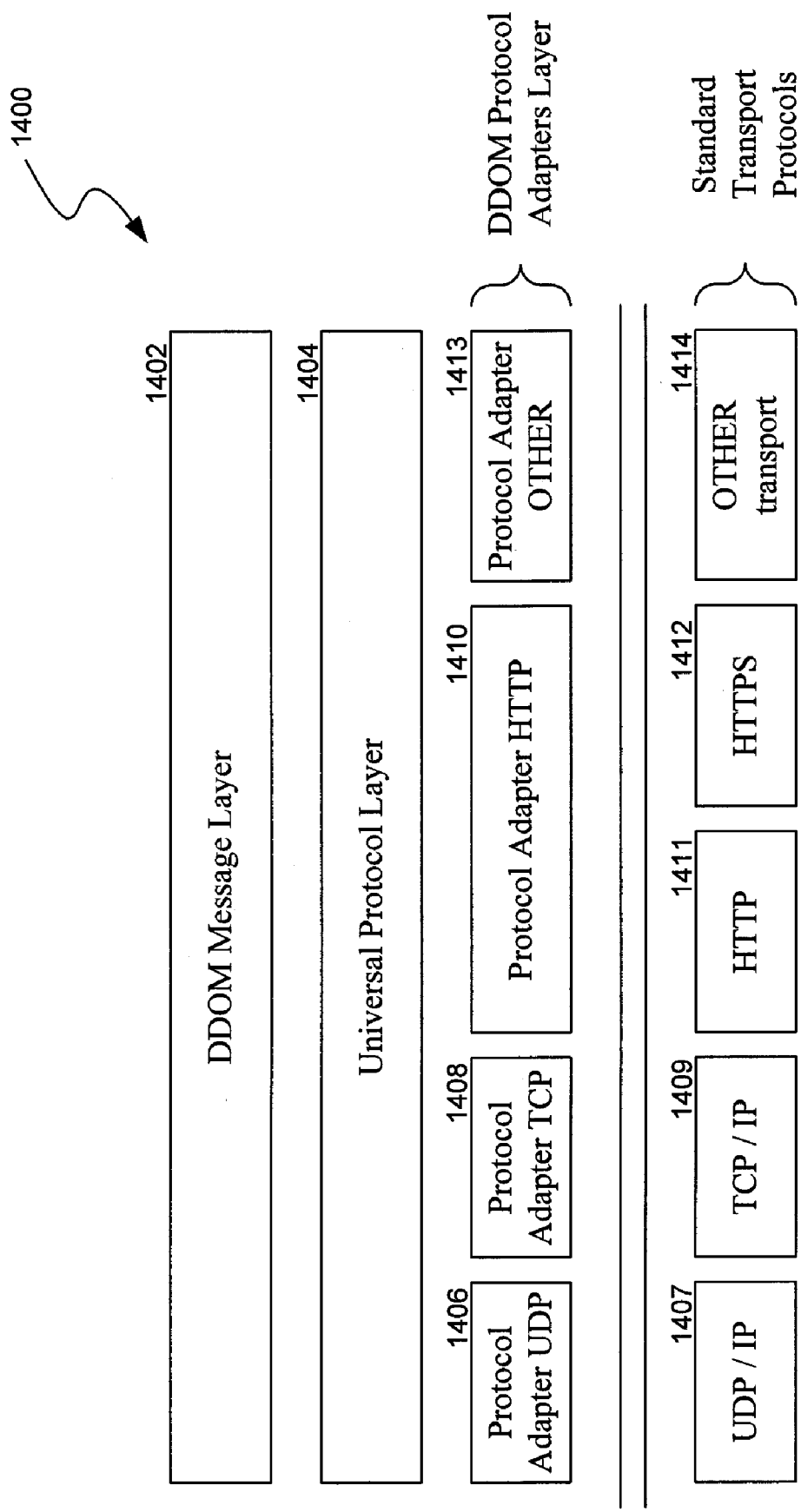
FIG. 14 is a block diagram illustrating an embodiment of the communications stack of the DDOM system.

FIG. 14 illustrates a block diagram of an embodiment of a communications protocol stack used by the system. The stack 1400 includes a DDOM Message Layer 1402. The Message Layer defines message content and format and may communicate with a Universal Protocol Layer 1404. The Universal Protocol Layer offers an abstract interface to the message layer for transmission and reception of messages. The Universal Protocol Layer interacts with a number of possible protocol adapters that manage communications over transport protocols. The illustrated embodiment shows UDP 1407, TCP 1409. HTTP 1411, and HTTPS 1412. As an example, a UDP protocol adapter 1406 manages communications over UDP 1407. Similarly, the TCP protocol adapter 1408 manages communications over TCP/IP. Furthermore, the HTTP protocol adapter 1410 manages communications over HTTP and HTTPS. The communication system architecture illustrated here can be extended to support other transport protocols 1414 as required via protocol adapter 1413. The UDP and HTTP communication protocols use the IP and TCP/IP protocol layers, respectively. Other communication protocols may either use the TCP protocol layer directly or another protocol layer 1414. The stack presents a session-oriented reliable layer to either a client DDOM system or a server DDOM system. One skilled in the art will recognize that a protocol stack may be comprised of individual or multiple protocol forms.

Figure 15:
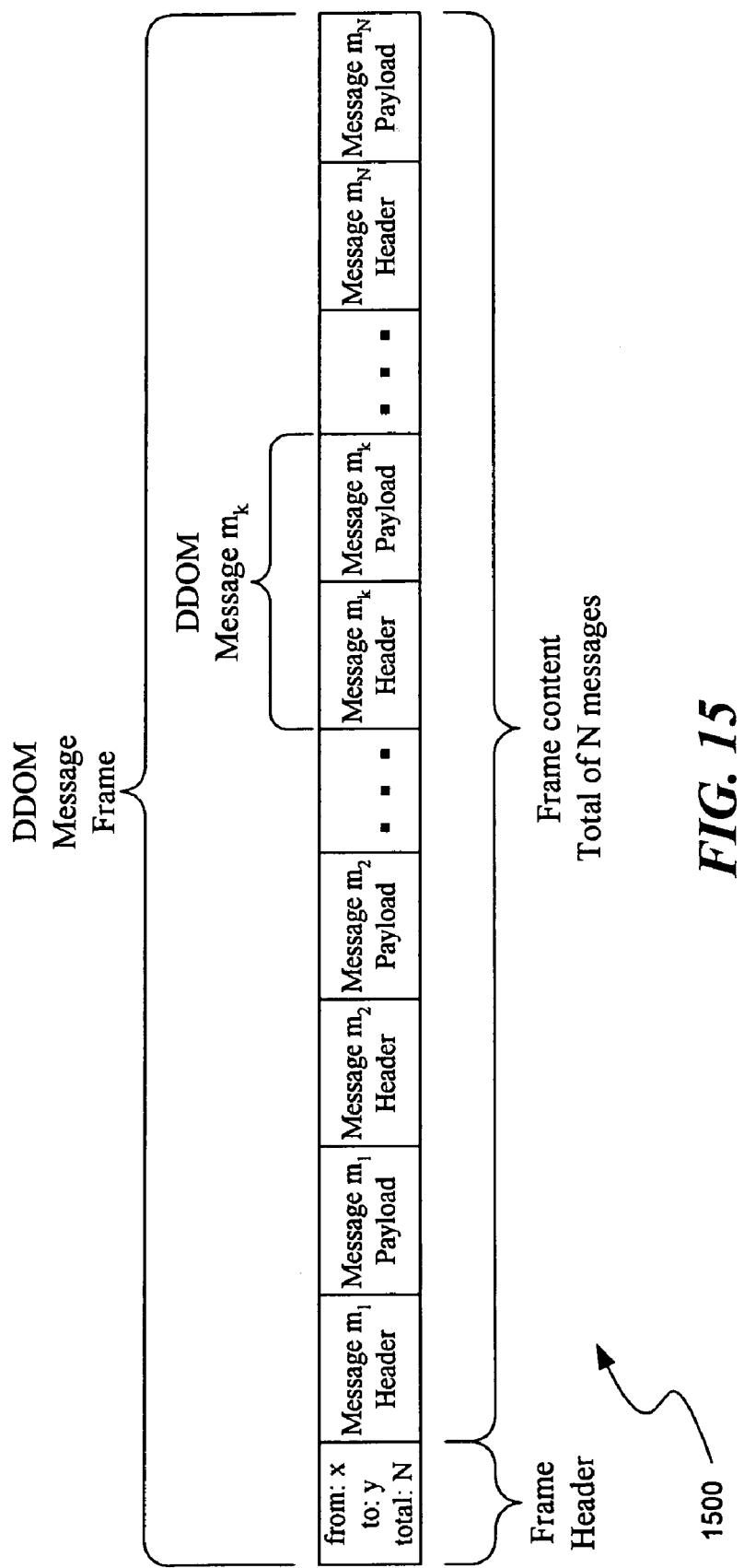
FIG. 15 is a block diagram illustrating an embodiment of the content of a DDOM frame.

FIG. 15 illustrates a block diagram of an embodiment of a DDOM frame. A DDOM frame 1500 may be comprised of a DDOM frame header and DDOM frame content. A DDOM frame header may include multiple fields. One field in the DDOM frame header may be an indication of a first message identifier in the DDOM content. A second field in the DDOM frame header may be a last message identifier in the DDOM content. The first message identifier may never be larger than the last message identifier. Another field in the DDOM frame header may be a count of a number of messages in the DDOM content. Contents of a DDOM frame may be binary-encoded. When the header data is binary encoded, a standard telecommunication byte ordering, such as most-significant bits first, may be used. The DDOM frame content comprises the messages indicated in the DDOM frame header. The DDOM frame content may also include other information. Messages in the DDOM frame content may have associated headers and payloads. Each message may also be identified by a message identifier. As an example, the DDOM frame header may contain an indication that the frame covers messages 8 through 12, and that two messages appear in the frame. A client receiving such a frame, having previously received upto message 6, would determine that it is missing message 7. A message payload may contain mutation-related information.

Figure 16:
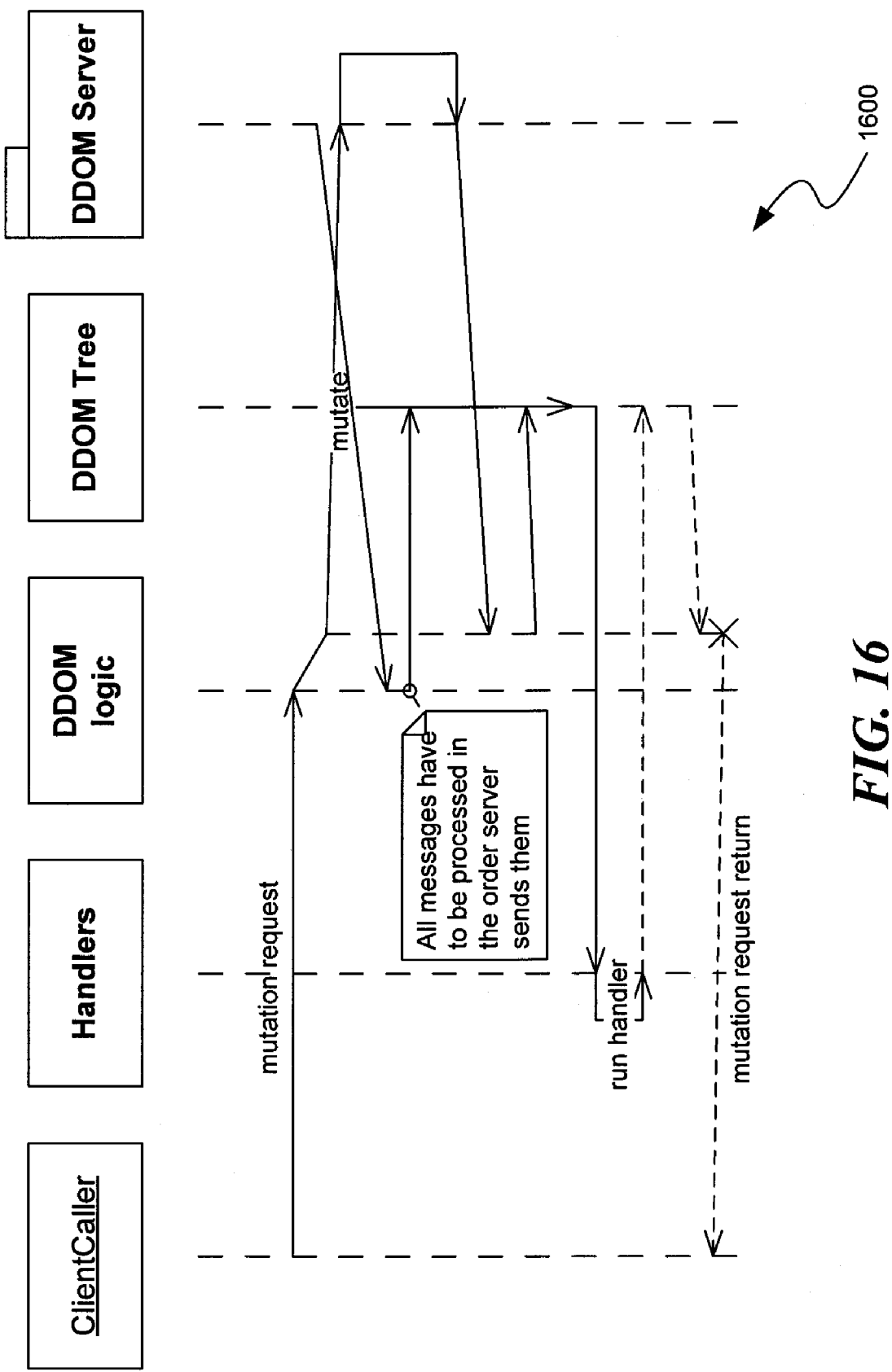
FIG. 16 is a block diagram illustrating an embodiment of a call execution pattern of the DDOM system in synchronous communications mode.

FIG. 16 is a block diagram illustrating an embodiment of a DDOM system call execution pattern when the DDOM system is operating in a synchronous mode. In this mode, when a client sends a mutation request to a server, the request is sent as a message to the DDOM server. Using various rules, the server may determine whether the mutation is applicable to the document as it presently exists on the server. If the requested mutations are applicable, the server may cause the mutations to occur on its master version of the document. Mutation requests may also be initiated by the server. For example, a mutation request may be initiated as a handler's reaction to a mutation request initiated by a client. Mutations may also be initiated asynchronously by the server in response to external stimuli. In an attempt to keep documents consistent across a servers master version and client copies, clients may process messages from the server in the same sequence in which the server sends messages.

Figure 17:
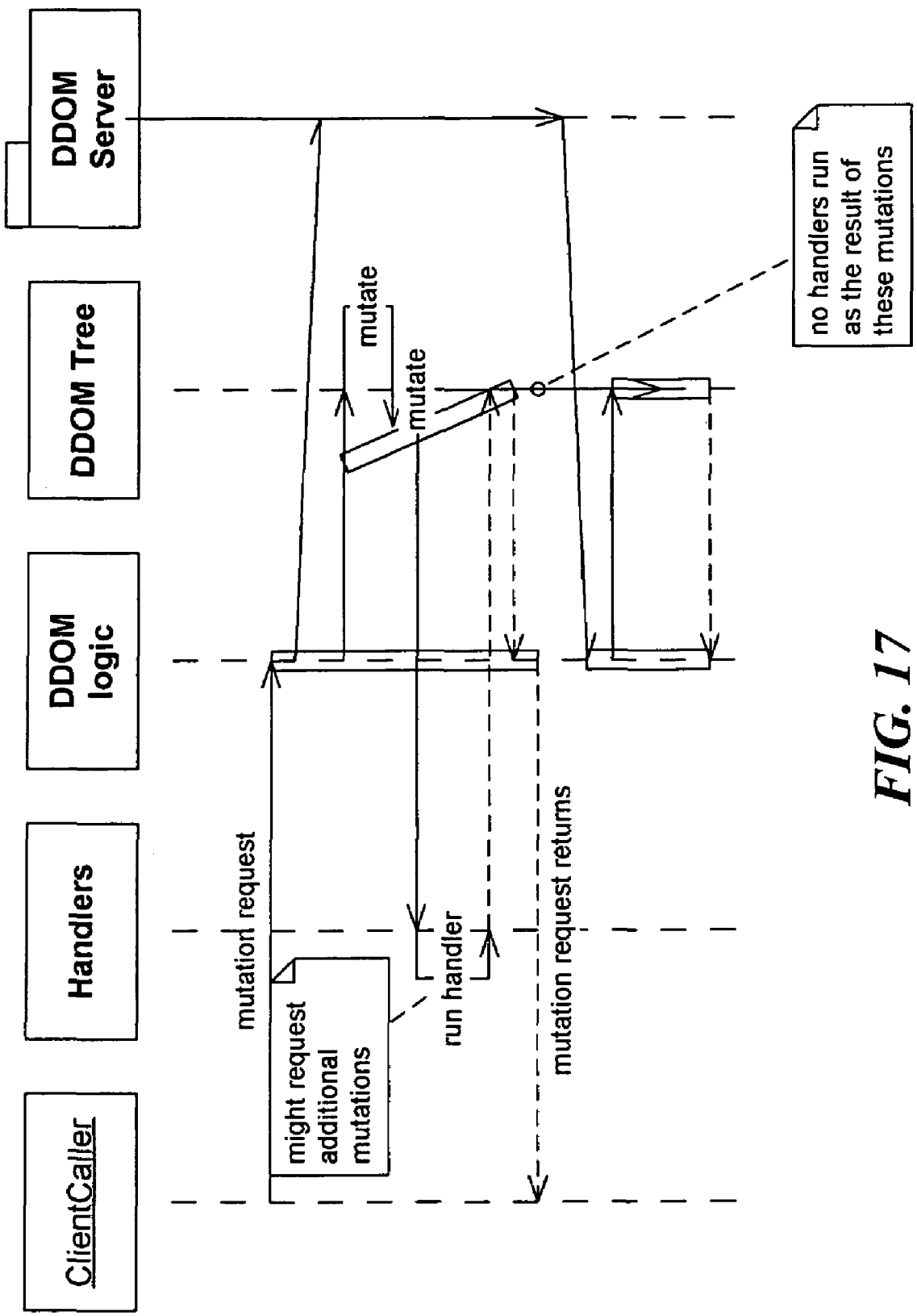
FIG. 17 is a block diagram illustrating an embodiment of a call execution pattern of the DDOM system in asynchronous communications mode.

FIG. 17 is a block diagram illustrating an embodiment of a DDOM system call execution pattern in an asynchronous mode. In this mode, a client sends a mutation request to a server. However, the client may continue to perform other mutations to its local copy of the document without receiving an acknowledgment from the server. Upon receiving a mutation request from a client, the server determines whether the mutation can be made based on a set of rules. The server may return an indication of success or failure to the client. Handlers on the client or the server may cause additional mutations to occur as a result of the client-initiated mutation.

Figure 18:
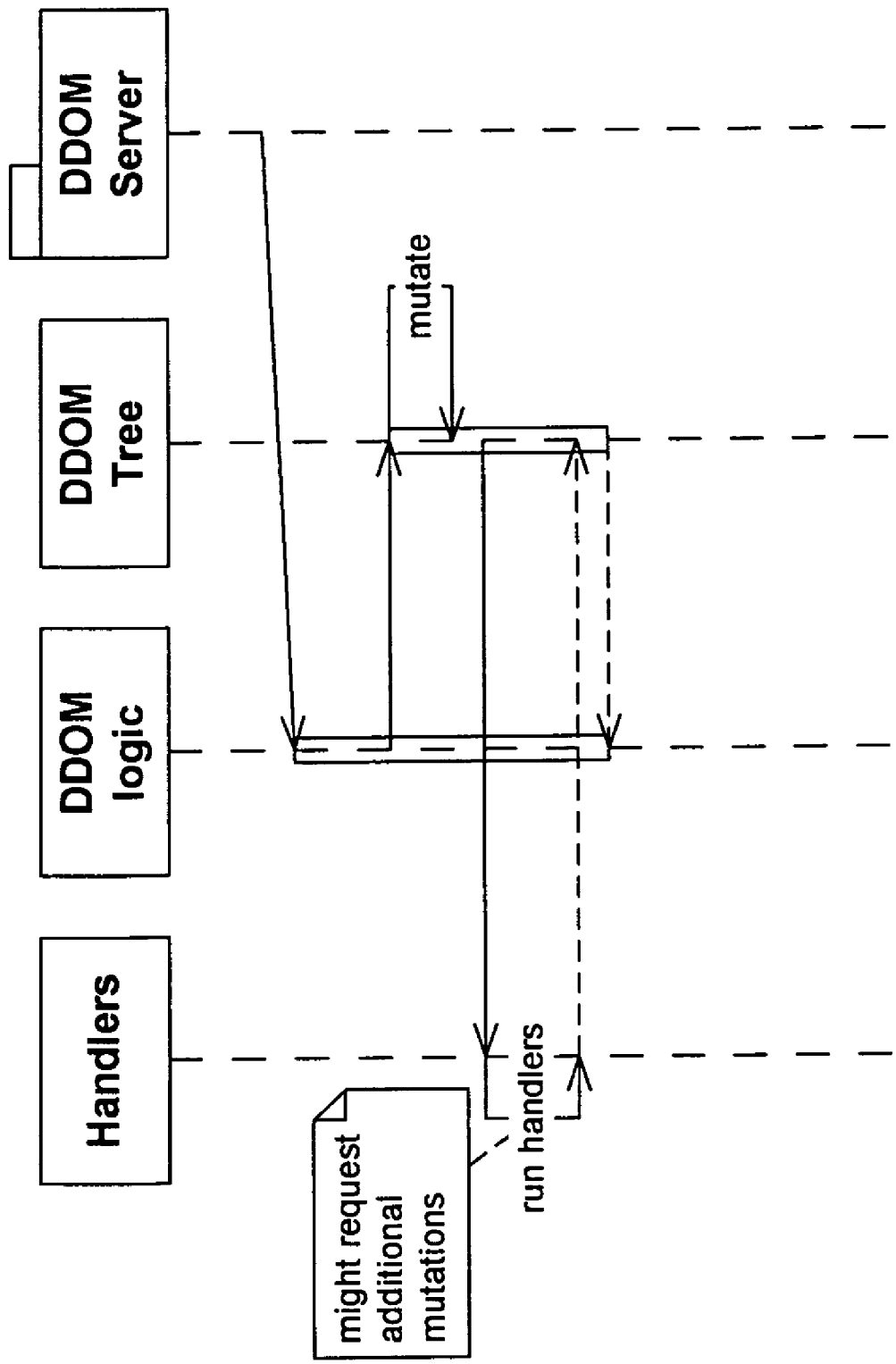
FIG. 18 is a block diagram of an embodiment of the DDOM system's notification execution pattern.

FIG. 18 is a block diagram illustrating an embodiment of a notification execution pattern of a DDOM system. A DDOM server may initiate a notification. A DDOM logic layer may cause the mutations specified in the notification to be made to a DDOM tree describing the document. Handlers may cause additional mutations to be made to the document. When a portion of the DDOM tree representing the document is not currently cached in, the system may have to load the relevant portion of the tree from storage before implementing the mutations.

A client may connect to a server when an author accesses or manipulates the document. Multiple clients may be connected to the server simultaneously. Other clients may be connecting or disconnecting during a given client's connection with the server. A client may have multiple connections to a server or to multiple servers simultaneously.

In some cases, a software application that already accesses documents using the DOM may be able to use the DDOM system without modification of the application. In such cases, the DOM-based mutations are "trapped" and routed via the central or server DDOM document. As an example, a software developer may add DOM event handlers to call the appropriate DDOM methods when a DOM-based mutation occurs. In other cases, the software application itself may need to be modified to use DDOM. As an example, a scalable vector graphics ("SVG") editor that does not natively support mutation events may need to be modified to use DDOM instead of DOM because mutation event handlers would never be called when no mutation events are fired. In such a case, calls to a DOM mutation method would have to be changed to call DDOM instead. One skilled in the art would know how to make these changes.

In other cases where the software application was written using some varieties of scripting languages, a "wrapper object" may be used that exports a DOM interface but either calls only DDOM to handle the mutation, or calls DOM and additionally notifies DDOM as a side effect to propagate mutations to the server or master document. One skilled in the art will recognize that not every option listed above is available in every case. As an example, a compiled executable program may not be able to utilize a wrapper object unless the wrapper object replaces the object to which the program refers.

The DDOM system may be retrofitted to existing software applications or used with newly created software applications designed to use DDOM. Use of a software component in a newly created software application by means of an API is understood in the art. The following discussion illustrates use of the DDOM in various retrofit cases. In this discussion, unless otherwise indicated, a client/server mode and peer-topeer mode should be considered to be equally contemplated. Similarly, a server-based document and a master document handled by a peer are equally contemplated. A server computer may be a computer system that first instantiated a DDOM document. Alternatively, a server computer may be a computer system that stores master documents. Even though an embodiment is described, other embodiments are also contemplated.

From the foregoing, it will be appreciated that although specific embodiments of the invention have been described herein for purposes of illustration, various modifications may be made without deviating from the spirit and scope of the invention. As an example, various forms of computing devices may be used, including palmtops, wireless phones, laptops, desktops, minicomputers, and mainframe computers. The concepts presented herein can be applied to forms of hierarchical documents other than XML documents. For example, the concepts may be applied to hierarchical databases. Accordingly, the invention is not limited except as by the appended claims.

We claim:

1. A method, in a client computing device having a memory, for enabling authors to work on a hierarchical document, comprising:
    retrieving a local copy of the hierarchical document from a server computing device;
    loading at least a portion of the local copy of the hierarchical document into the memory of the client computing device;
    receiving an indication of a requested mutation to the in-memory portion of the local copy of the hierarchical document from a user;
    sending a message to the server computing device containing the requested mutation, the message represented in XML, wherein the in-memory portion of the local copy of the hierarchical document remains available for editing by the user;
    when the requested mutation is successfully applied by the server computing device to the hierarchical document, receiving a message from the server computing device acknowledging a successful mutation to the hierarchical document, the message is represented in XML; and
    when the requested mutation is not successfully applied by the server computing device to the hierarchical document, receiving a message from the server computing device containing an indication to revert the local copy of the hierarchical document to a current form of the hierarchical document on the server computing device, the message represented XML, wherein the hierarchical document comprises a DDOM for providing a real-time view of document state.

2. The method of claim 1 wherein an application program is the user.

3. The method of claim 1 wherein an author is using an application program that accesses the hierarchical document.

4. The method of claim 3 wherein the author makes a change to the hierarchical document using the application program and further wherein the indication of a requested mutation relates to the change.

5. The method of claim 1 wherein the message is contained in a frame.

6. The method of claim 5 wherein the frame comprises multiple messages.

7. The method of claim 1 wherein when the message from the server computing device is received, the message contains no nodes that the author is not privileged to read.

8. The method of claim 1 wherein the requested mutation is not successfully applied when the user is not privileged to make the requested mutation.

9. The method of claim 1 wherein the requested mutation is not successfully applied when the requested mutation conflicts with a mutation previously made to the hierarchical document on the server computing device.

10. The method of claim 1 wherein the message containing an indication to revert the document comprises sufficient information to determine the current form of the hierarchical document on the server computing device.

11. The method of claim 1 wherein the message acknowledging the mutation includes additional mutations to be applied to the local copy of the hierarchical document.

12. A system, in a client computing device having a memory, for enabling authors to work on a hierarchical document, comprising:
    a component that retrieves from a server computing device the hierarchical document and makes a local copy of the retrieved hierarchical document;
    a component that loads at least a portion of the local copy of the hierarchical document into the memory of the client computing device;
    a component that receives from a user an indication of a requested mutation to the in-memory portion of the local copy of the hierarchical document;
    a component that sends to the server computing device a message containing the requested mutation, the message represented in XML, wherein the in-memory portion of the local copy of the hierarchical document remains available for editing by the user; and
    a component that receives from the server computing device a message indicating whether the requested mutation was successfully applied to the hierarchical document, the message represented in XML, wherein the hierarchical document comprises a DDOM for providing a real-time view of document state and, when the requested mutation was not successfully applied, the message received from the server contains information corresponding to a current form of the hierarchical document sufficient to mutate the local copy of the hierarchical document to reflect the current form of the hierarchical document on the server computing device.

13. The system of claim 12 wherein the message from the server computing device arrives in a frame.

14. The system of claim 13 wherein the frame comprises multiple messages.

15. The system of claim 13 wherein the frame has an indication of a first message identifier and a last message identifier.

16. The system of claim 15 wherein the component that receives the message from the server determines whether a message was missed.

17. The system of claim 16 wherein a message is missed when the first message identifier exceeds, by more than a predetermined number, an identifier of a last message previously received from the server computing device.

18. The system of claim 17 wherein the predetermined number is one.

19. The system of claim 12 including a component for determining whether a DDOM fragment can be used to handle the requested mutation.

20. The system of claim 19 wherein the DDOM fragment can be used before a node is added to the hierarchical document.

21. The system of claim 19 wherein a node is added to the DDOM fragment before the DDOM fragment is added to the hierarchical document.

22. The system of claim 19 wherein a mutation is made in relation to the node.

23. The system of claim 19 wherein the message containing the requested mutation is not sent to the server computing device.

24. A method in a server computing device for enabling authors to work on a hierarchical document, comprising:
for each author,
providing to a client computing device having a memory a copy of the hierarchical document, wherein at least a portion of the client copy of the hierarchical document is loaded into the memory of the client computing device, the hierarchical document comprising a DDOM for providing a real-time view of document state;
receiving from the client computing device an indication of a mutation request corresponding to a mutation made to the in-memory portion of the client copy of the hierarchical document, wherein the in-memory portion of the client copy of the hierarchical document remains available for editing by the author;
attempting to apply the received mutation request to the hierarchical document;
when the mutation cannot be applied to the hierarchical document,
sending to the client computing device a message containing an indication to revert the client copy of the hierarchical document to a current form of the hierarchical document; and
when the mutation can be applied to the hierarchical document,
sending to the client computing device a message containing an indication of an applied mutation,
wherein the messages are represented in XML.

25. The method of claim 24 wherein the indication of the applied mutation is sent as an answer to the client computing device.

26. The method of claim 24 wherein the indication of the applied mutation is sent as a broadcast message to a second client computing device having a copy of the hierarchical document.

27. The method of claim 26 wherein when the broadcast message is received by the second client computing device after the second client computing device has sent a requested mutation message but before the second client computing device receives an answer, the mutation indicated in the broadcast message is applied to the client copy of the hierarchical document.

28. A method in a distributed computer system for sharing a hierarchical document, comprising:
receiving at a server computer system a hierarchical document from a document source client computer system, the hierarchical document comprising a DDOM for providing a real-time view of document state;
distributing to a client computer system other than the document source client computer system a copy of the hierarchical document, wherein the client computer system has a memory and at least a portion of the copy of the hierarchical document is loaded into the memory;
receiving from a client computer system a mutation request to be applied to the hierarchical document, wherein the mutation request corresponds to a mutation made to the in-memory portion of the client copy of the hierarchical document, and further wherein the in-memory portion of the client copy of the hierarchical document remains available for editing on the document source client computer system;
sending to the client computer system from which the request was received a response message containing an answer; and
sending to a connected client computer system other than the client computer system from which the mutation request was received a broadcast message,
wherein the messages are represented in XML.

29. The method of claim 28 wherein the distributing occurs when a client computer system other than the document source client computer system requests the hierarchical document.

30. The method of claim 28 wherein the mutation request is received from the document source computer system.

31. The method of claim 28 wherein the mutation request is received from a client computer system other than the document source computer system.

32. The method of claim 28 wherein the mutation request is to delete a node.

33. The method of claim 32 wherein the node is placed into a pool of deleted nodes.

34. The method of claim 28 wherein the pool is periodically cleared.

35. A method, performed by a computing device having a memory, for enabling authors to work on a hierarchical document, comprising:
retrieving the hierarchical document from another computing device, the hierarchical document comprising a DDOM for providing a real-time view of document state;
loading at least a portion of the hierarchical document into the memory;
modifying the in-memory portion of the retrieved hierarchical document;
sending an indication of the modification as a message comprising a mutation request, the message represented in XML, to the other computing device, wherein the in-memory portion of the hierarchical document remains available for editing on the computing device;
when the sent modification cannot be applied to the hierarchical document on the other computing device, reverting the hierarchical document to a current form of the hierarchical document on the other computing device; and
when the sent modification is applied on the other computing device, receiving an indication that the modification was successfully applied.

36. The method of claim 35 wherein the modifying includes adding a node.

37. The method of claim 35 wherein the modifying includes removing a node.

38. The method of claim 35 wherein the modifying includes changing values corresponding to an attribute of a node.

39. The method of claim 35 wherein the indication is a message.

40. The method of claim 39 where contents of the message are represented in XML.

41. The method of claim 35 including receiving an indication of a failure when the sent modification cannot be applied on the other computing device.

42. The method of claim 41 wherein the indication includes information corresponding to the hierarchical document sufficient to determine the current form of the hierarchical document on the other computing device.

43. The method of claim 35 wherein the modifying includes calling a method of an XML document object model.

44. The method of claim 35 wherein the modifying is performed by a user.

45. The method of claim 44 wherein the user is a client-side application program that implements business logic.

46. The method of claim 44 wherein the user is a human.

47. The method of claim 44 wherein the user uses an application program interface of the client component.

48. A system including a processor for enabling authors to work on a hierarchical document, comprising:
   a component that exchanges messages with a client computing device having a memory, the messages represented in XML;
   a component that loads a hierarchical document, the hierarchical document comprising a DDOM for providing a real-time view of document state; and
   a component that receives a message corresponding to a mutation request from the client computing device, determines whether the mutation request can be applied to the hierarchical document, applies the mutation to the hierarchical document, and sends an indication message of an applied mutation to the client computing device wherein the indication message is a broadcast message;
   wherein the mutation request corresponds to a mutation made to at least a portion of a copy of the hierarchical document loaded into the memory of the client computing device, and further wherein the in-memory portion of the copy of the hierarchical document remains available for editing on the client computing device.

49. The system of claim 48 wherein the indication message of an applied mutation is an answer message to a client that made the mutation request.

50. The system of claim 48 wherein the determining includes receiving an indication from a server-side application that implements business logic.

51. The system of claim 48 wherein the determining includes checking a privilege.

52. The system of claim 48 wherein the hierarchical document is represented as a tree.

53. The system of claim 52 wherein the tree is represented in XML.

54. The system of claim 48 wherein a message includes mutations corresponding to multiple nodes.

55. The system of claim 48 wherein a message includes mutations corresponding to a node.

56. The system of claim 48 wherein the determining includes checking whether a node is in the document.

57. The system of claim 48 including a component for storing the applied mutation in a log of mutations.

58. The system of claim 57 including a component for creating a view of the hierarchical document based on a snapshot of the hierarchical document and the applied mutation stored in the log of mutations.

* * * * *

UNITED STATES PATENT AND TRADEMARK OFFICE
CERTIFICATE OF CORRECTION

PATENT NO. : 7,424,671 B2
APPLICATION NO. : 10/817013
DATED : September 9, 2008
INVENTOR(S) : Dethe Elza et al.

It is certified that error appears in the above-identified patent and that said Letters Patent is hereby corrected as shown below:

On the Title Pg on page 2, item -56- line 1, delete "6,296,850 10/2001 Bjorklund" and insert, -- 6,496,850 12/2002 Bowman-Amuah --, therefor.

On the Title Pg on Page 2, item -56- lines 16-20, delete
"Unpublished U.S. Appl. No. 10/817,682
Unpublished U.S, Appl. No. 10/817,046
Unpublished U.S. Appl. No. 10/817,045
Unpublished U.S. Appl. No. 10/817,050
Unpublished U.S. Appl. No. 10/817,683"

In column 11, line 10, delete "clients'copies" and insert -- clients' copies --, therefor.

In column 20, line 25, delete "hierarchial" and insert -- hierarchical --, therefor.

In column 20, line 27, delete "hierarchial" and insert -- hierarchical --, therefor.

In column 21, line 25, before "hierarchical" delete "the".

In column 22, line 43, delete "asychronous" and insert -- asynchronous --, therefor.

In column 23, line 22, delete "client'local" and insert -- client's local --, therefor.

In column 23, line 25, delete "log'records" and insert -- log's records --, therefor.

In column 23, line 33, delete "occuring" and insert -- occurring --, therefor.

In column 23, line 34, delete "asychrounously" and insert -- asynchronously --, therefor.

In column 23, line 60, delete "sibbling," and insert -- sibling, --, therefor.

In column 23, line 63, delete "sibbling" and insert -- sibling --, therefor.

In column 23, line 65, delete "specifiying" and insert -- specifying --, therefor.

In column 24, line 5, delete "sibbling" and insert -- sibling --, therefor.

In column 24, line 6, delete "sibbling" and insert -- sibling --, therefor.

In column 24, line 7, delete "sibbling's" and insert -- sibling's --, therefor.

UNITED STATES PATENT AND TRADEMARK OFFICE
CERTIFICATE OF CORRECTION

PATENT NO. : 7,424,671 B2
APPLICATION NO. : 10/817013
DATED : September 9, 2008
INVENTOR(S) : Dethe Elza et al.

It is certified that error appears in the above-identified patent and that said Letters Patent is hereby corrected as shown below:

In column 24, line 7, delete "sibbling" and insert -- sibling --, therefor.

In column 24, line 8, delete "sibbling." and insert -- sibling. --, therefor.

In column 24, line 9, delete "sibblings" and insert -- siblings --, therefor.

In column 24, line 10, delete "sibblings" and insert -- siblings --, therefor.

In column 24, line 12, delete "sibbling" and insert -- sibling --, therefor.

In column 24, line 13, delete "sibbling." and insert -- sibling. --, therefor.

In column 25, line 17, delete "1409. HTTP" and insert -- 1409, HTTP --, therefor.

In column 26, line 4, delete "servers" and insert -- server's --, therefor.

Signed and Sealed this

Thirteenth Day of October, 2009

David J. Kappos
*Director of the United States Patent and Trademark Office*